United States Patent
Roisin et al.

(10) Patent No.: US 9,581,167 B2
(45) Date of Patent: Feb. 28, 2017

(54) TURBO-COMPRESSOR-CONDENSER-EXPANDER

(71) Applicant: Appollo Wind Technologies LLC, Saint Petersburg, FL (US)

(72) Inventors: Benoit Roisin, Croydon, NH (US); Andrew S. Geffken, Haverford, PA (US); Ian E. Graves, Seattle, NH (US)

(73) Assignee: Appollo Wind Technologies, LLC, Saint Petersburg, FL (US)

( * ) Notice: Subject to any disclaimer, the term of this patent is extended or adjusted under 35 U.S.C. 154(b) by 320 days.

(21) Appl. No.: 14/078,453

(22) Filed: Nov. 12, 2013

(65) Prior Publication Data
US 2014/0069138 A1     Mar. 13, 2014

Related U.S. Application Data

(62) Division of application No. 12/691,383, filed on Jan. 21, 2010, now Pat. No. 8,578,733.
(Continued)

(51) Int. Cl.
*F25B 3/00*     (2006.01)
*F04D 17/12*     (2006.01)
(Continued)

(52) U.S. Cl.
CPC .............. *F04D 17/12* (2013.01); *B60H 1/3223* (2013.01); *B60H 1/3227* (2013.01);
(Continued)

(58) Field of Classification Search
CPC ............ F25B 1/053; F25B 3/00; F04D 29/444
See application file for complete search history.

(56) References Cited

U.S. PATENT DOCUMENTS

| 2,424,878 A | 5/1941 | Bode |
| 2,393,338 A | 1/1946 | Roebuck |

(Continued)

FOREIGN PATENT DOCUMENTS

| BE | 654270 | 10/1964 |
| WO | 0175290 A1 | 10/2001 |

(Continued)

*Primary Examiner* — M. Alexandra Elve
*Assistant Examiner* — Alexis Cox
(74) *Attorney, Agent, or Firm* — Loginov & Associates, PLLC; William A. Loginov

(57) ABSTRACT

An isothermal turbo-compressor-condenser-expander arrangement includes heat-transferring blades that are mounted on, or surround, individual conduits. In operation, the open framework rotates in free air to promote heat exchange. The assembly includes a first plurality of spokes extending radially outwardly from a first central hub to an outer perimeter with first radial conduits that transport refrigerant under centrifugal force and compression from the hub to the outer perimeter. The first radial conduits include heat exchanging blades. A second plurality of spokes extend radially outwardly from a second central hub that each includes a second thermally-insulated conduit that transports refrigerant from the outer perimeter to the second central hub. Axial conduits extend axially at the outer perimeter. At least some of the axial conduits include an axial blade in thermal communication with the conduit.

20 Claims, 19 Drawing Sheets

Related U.S. Application Data

(60) Provisional application No. 61/146,022, filed on Jan. 21, 2009.

(51) Int. Cl.
- *B60H 1/32* (2006.01)
- *F04D 29/28* (2006.01)
- *F04D 29/44* (2006.01)
- *F04D 29/58* (2006.01)
- *F25B 1/053* (2006.01)
- *F28D 1/02* (2006.01)
- *F28F 13/12* (2006.01)
- *F25B 31/00* (2006.01)

(52) U.S. Cl.
CPC ......... *F04D 29/288* (2013.01); *F04D 29/444* (2013.01); *F04D 29/582* (2013.01); *F25B 1/053* (2013.01); *F25B 3/00* (2013.01); *F25B 31/00* (2013.01); *F28D 1/024* (2013.01); *F28F 13/125* (2013.01)

(56) References Cited

U.S. PATENT DOCUMENTS

| | | |
|---|---|---|
| 2,522,781 A | 9/1950 | Exner |
| 3,332,253 A | 7/1967 | Alexander |
| 3,470,704 A | 10/1969 | Kantor |
| 3,981,627 A | 9/1976 | Kantor |
| 4,077,230 A | 3/1978 | Eskeli |
| 4,117,695 A | 10/1978 | Hargreaves |
| 4,178,766 A | 12/1979 | Eskeli |
| 4,242,878 A | 1/1981 | Brinkerhoff |
| 4,282,716 A | 8/1981 | Momose et al. |
| 4,311,025 A | 1/1982 | Rice |
| 4,420,944 A | 12/1983 | Dibrell |
| 4,420,945 A | 12/1983 | Dibrell |
| 4,464,908 A | 8/1984 | Landerman et al. |
| 4,513,575 A | 4/1985 | Dibrell |
| 4,524,587 A | 6/1985 | Kantor |
| 5,386,685 A | 2/1995 | Frutschi |
| 5,477,688 A | 12/1995 | Ban et al. |
| 5,674,053 A | 10/1997 | Paul et al. |
| 5,839,270 A | 11/1998 | Jirnov et al. |
| 6,120,253 A * | 9/2000 | Graves .................. F04C 19/00 415/206 |

FOREIGN PATENT DOCUMENTS

| | | |
|---|---|---|
| WO | 2006017888 A1 | 2/2006 |
| WO | 2008018812 A1 | 2/2008 |

* cited by examiner

TURBO-COMPRESSOR-CONDENSER-EXPANDER

RELATED APPLICATIONS

This application is a divisional of co-pending U.S. patent application Ser. No. 12/691,383, filed Jan. 21, 2010, entitled TURBO-COMPRESSOR-CONDENSER-EXPANDER, the entire disclosure of which is herein incorporated by reference, which claims the benefit of U.S. Provisional Patent Application Ser. No. 61/146,022, filed Jan. 21, 2009, entitled ISOTHERMAL TURBOCOMPRESSOR, the entire disclosure of which is also herein incorporated by reference.

FIELD OF THE INVENTION

The present invention relates generally to the field of devices used for the compression and condensation of refrigerant in an air-conditioning, refrigeration, heat-pumping, or other cooling/heat-transfer system.

BACKGROUND OF THE INVENTION

In air-conditioning, refrigeration, heat-pumping, and other refrigerant-based systems, heat is removed from a colder side of a device or system and transferred to a warmer side. For example in the case of air-conditioning, heat is transferred from the interior of a building, vehicle or other enclosed space to the exterior atmosphere. A standard process of removing colder air from one chamber and transferring it to another chamber or area includes four steps: compression of a refrigerant, followed by heat expulsion to the warm side, followed by a sudden expansion or other means of decompression, and finally absorption of heat from the cold side.

According to a typical prior art system, such as that illustrated in FIG. 1, both a compressor and a heat exchanger are separately required to accomplish the first two steps of the refrigeration cycle. As illustrated, the prior art air-conditioning/cooling system 100 defined by a refrigerant loop includes a compressor 110 that compresses the refrigerant fluid (typically a gas at that stage) by pressurizing it, which causes its temperature to increase in the output, compressed refrigerant. An electrical (or other power source) drive typically delivers the mechanical energy required to perform the compression of the refrigerant. The compressor typically uses an impeller or piston or other arrangement to compress the refrigerant. As shown, the refrigerant flows through the system loop 100 in accordance with the flow arrows 121.

The system 100 also includes a condenser 120, comprising an exterior coil 122, that provides a surface area capable of sufficient heat exchange as the heat generated by the (heated) pressurized refrigerant within the coil is transferred to the exterior (cooler side) by the atmospheric air (or other transfer fluid) passing over the coil. This causes the refrigerant to expel heat and liquefy. Once a sufficient amount of heat is removed, the refrigerant is expanded and decompressed in an expansion valve 125, causing its temperature to drop to a temperature below that of the cold chamber. The refrigerant subsequently enters a heat exchanger 132, where it flows trough a set of coils 131 and is exposed (typically by means of a fan 140) to the air of the cold chamber, from which, by virtue of the refrigerant's lower temperature, heat is extracted and communicated to the refrigerant, which vaporizes in the process (i.e. the refrigerant "absorbs" the heat).

As the refrigerant passes through the heat exchanger 132 (consisting of coil 131 and fan 140) inside the chamber 130 and becomes warmer, heat is transferred from the surrounding space 132 by a fan 140 (or alternatively ram air, as in the case of vehicle motion), and produces cool air that is ejected into the space being the object of cooling. The refrigerant returns to a vapor phase based upon the heat withdrawn from the air that passed over the coil 131. The refrigerant vapor then returns to the compressor 110 to become a high-pressure gas again. The heat then flows from the high-temperature gas to the lower-temperature air of the space surrounding the coil 122. This heat loss causes the high-pressure gas to condense to liquid, which again passes through expansion valve 125 into coil 131 inside the chamber 130 to repeat the compression, and then condensation cycles. This process is continually performed to condition air in compartments (i.e. cool or heat) as desired.

A disadvantage of the air-conditioning arrangement illustrated in FIG. 1 is that it requires a compressor to first pressurize the refrigerant so that it becomes high-pressure, heated gas, a condenser for providing the heat exchange required to cool down the refrigerant before it passes into the coil within the refrigerant compartment, and an expansion valve. This typically requires three separate and discrete devices, one for performing each process within the air-conditioning/refrigeration cycle and interconnected by appropriate tubing. This reduces efficiency and increases component count and cost. More particularly, it is a well-established fact of thermodynamics that, at identical pressures, more energy is required to compress a gas at a higher temperature than the same gas at a lower temperature. Thus, compression with delay of heat expulsion until completion of the compression requires more energy than compression with anticipated heat expulsion during the compression. The ability to carry out this process in a more-isothermal manner, in which heat is removed from the refrigerant simultaneously with the compression, can provide a more-efficient overall process. Another disadvantage is the physical separation of the expansion valve 125 from the compressor 110, which prevents transfer of energy removed from the fluid during expansion to the compressor in order to reduce its energy demand.

Various systems have attempted to overcome this disadvantage, including providing systems having multi-stage compression components separated by intermediate cooling stages, on one hand, and systems with expansion through a turbine sharing a rotating shaft with the compressor, on the other hand. However, these systems typically require an increased number of components relative to a conventional arrangement, for example a first-stage compressor, flash chamber, heat exchanger, and second-stage compressor. These multi-stage systems have typically been limited to large-scale refrigeration systems due to the number of components (and associated higher cost) required for operation. This cost and complexity renders such systems, undesirable for smaller scale air-conditioning and refrigeration applications.

According to prior art arrangements, piston-type compressors are provided that include cooling jackets that remove heat from the compressor wall to enhance isothermalism, and/or intermediate heat exchangers between the stages of a multi-stage compressor assembly. However, these compressors operate with a reciprocating piston that does not allow sufficient physical proximity between the refrigerant under compression (inside the piston chamber) and the fluid (such as atmospheric air) used for the cooling, and only a fraction of the heat can be extracted during the compression. There is currently no available system in which a large portion of cooling (and condensation) occurs during the compression cycle to improve efficiency, particularly, one which does not involve a series of separate components that increase cost and complexity.

It is thus desirable to provide a single apparatus capable of performing simultaneous refrigerant compression, condensation, and expansion, thereby improving efficiency and overall design of air-conditioning, refrigeration and heat-pumping systems. This system should further provide the advantage of a fewer number of components for performing the required heat transfer from a cold side to a warmer side.

SUMMARY OF THE INVENTION

This invention overcomes disadvantages of the prior art by providing a combined device that incorporates an isothermal turbocompressor, a turbocondenser and turboexpander for use in a system that transfers heat from a colder side to a warmer side, for example, a refrigerant-based heat-pumping system that performs the compression and condensation of the refrigerant in an air-conditioning/refrigeration heat-exchange cycle.

In one embodiment, an exemplary isothermal turbocompressor (without turbocondenser or turboexpander stages) includes a central hub having a plurality of spokes extending radially outwardly therefrom to an outer stationary plenum. In operation, the rotating central hub directs refrigerant from an inlet feeding tube, which then flows trough at least one tube disposed in each of the spokes. The tubes direct the flow of refrigerant to the outer stationary plenum, via the centrifugal force exerted by the spinning of the central hub according to one embodiment. This applied centrifugal force also performs the compression of the refrigerant by the force exerted thereon as it is collected within the plenum.

According to another illustrative embodiment, the flow of refrigerant is directed outwardly through a spoke framework, and back inwardly to undergo centrifugal force exerted by spinning the central hub. This performs the compression and then condensation required during the refrigeration cycle.

More particularly, the outer plenum includes a circumferential groove or well that faces openings in the spokes, and from which compressed refrigerant exits the spokes and enters the plenum. Once in the plenum, the compressed refrigerant is directed to at least one externally directed outlet. The stationary inlet feeding tube of the hub and the outer plenum are joined to the spinning component by associated seals.

The spokes can define fins having an appropriate aerodynamic shape and constructed from a material with good heat-transfer characteristics. The fins generate an airflow over their surface by drawing the cooling fluid, typically air, across the device and thereby cooling the refrigerant within the spokes. The turbocompressor thus also acts as a fan, with the spokes of the compressor collectively acting as a fan, thereby cooling and thus condensing the refrigerant simultaneously while it is compressed. In this manner, a device can perform both the compression and cooling stages of a refrigerant in an air-conditioning system, and thereby provide a more-isothermal compression process as heat is withdrawn from the refrigerant via the thermal exchange between the cooling fluid and the surface of the spokes as the compression occurs. The motor that rotationally drives the spokes with respect to the inlet and plenum can be variable in speed.

In an illustrative embodiment, the isothermal turbocompressor includes a central hub mounted on a rotating shaft, driven by a motor, to thereby cause the central hub to rotate. The central hub having an inner volume receiving a flow of refrigerant from a rotationally interconnected stationary inlet. A plurality of spokes are attached to, and each extends radially outwardly from, the central hub to a rim. The spokes each define a shape that generates lift during rotation of the hub so as to direct airflow thereover. At least some of the spokes each respectively include a conduit that extends from the inner volume of the hub to a radially outward wall of the rim. A plenum is provided with a circumferential annular well in which the rim rotates. The well is constructed and arranged to collect the refrigerant in a pressurized state from each of the conduits, and the plenum includes at least one outlet located in fluid communication with the annular well.

According to an illustrative embodiment, the open framework defines a combined turbo-compressor-condenser-expander arrangement, which includes heat-transferring blades that are mounted on, or surround, individual conduits to promote air exchange and heat transfer. In operation, the open framework rotates in free air to promote heat exchange. This optimizes contact with free air during rotation. The blades are in thermal contact with the conduits in each embodiment.

In an illustrative embodiment an isothermal turbo-compressor-condenser-expander assembly includes a first plurality of spokes extending radially outwardly from a first central hub to an outer perimeter. At least some of the first plurality of spokes each includes a first radial conduit that transports refrigerant from the first central hub to the outer perimeter and a radial blade in thermal communication with the first radial conduit that promotes heat exchange radially. There is provided a second plurality of spokes extending radially outwardly from a second central hub located at an axial spacing from the first central hub. At least some of the second plurality of spokes each includes a second radial conduit that transports refrigerant from the outer perimeter to the second central hub. The second plurality of spokes include, among possibly other materials, some thermally resistant material to act as a thermal barrier. A plurality of axial conduits extend axially at the outer perimeter between the first plurality of spokes and the second plurality of spokes, and each interconnecting the first radial conduit and the second radial conduit, respectively, to direct refrigerant therebetween. At least some of the plurality of axial conduits each includes an axial blade in thermal communication with the axial conduit, which promotes heat exchange. A motor rotates a central axis (such as a solid or hollow drive/connecting shaft) operatively connected to the first central hub and the second central hub to thereby rotate the first plurality of spokes and the second plurality of spokes so that the refrigerant experiences centrifugal force to perform compression with respect to each first radial conduit and decompression with respect to each second radial conduit. The refrigerant, likewise, experiences condensation with respect to each axial conduit.

In an illustrative embodiment, the first central hub includes a precompression assembly. The precompression assembly can comprise a housing having a piston assembly in fluid communication with each first radial conduit. The driven central axis defines a hollow shaft that directs the refrigerant from an inlet adjacent the second central hub into the piston assembly so as to be precompressed by the piston assembly before entering each first radial conduit. The piston assembly can be driven, for example, by a separate motor or by a shaft that remains stationary while the housing rotates. The inlet adjacent to the second central is illustratively located on a non-rotating inlet base rotating fluid union. Likewise, the rotating fluid union includes a non-rotating outlet base, axially separated from the inlet base. The outlet base is in fluid communication with passages that surround a central passage in communication with the inlet. The passages are in fluid communication with each second radial conduit. In this manner, the inlet and outlet are both located on one end of the device. A drive pulley or other member can be mounted on the hollow shaft adjacent to the fluid union.

BRIEF DESCRIPTION OF THE DRAWINGS

The invention description below refers to the accompanying drawings, of which.

DETAILED DESCRIPTION

In accordance with an illustrative embodiment, there is provided an isothermal turbocompressor (with or without an associated turbocondenser and turboexpander) for use in a refrigerant-based air-conditioning system. The system may be implemented for a variety of uses, including a refrigerator, air conditioner, heat pump, and other heating or cooling systems using a compressible refrigerant. The turbocompressor may also be used for the purpose of a more-energy-efficient method for compressing a gas prior to transportation by pipeline or by container. In such cases, the transported gas is broadly termed herein as "refrigerant", and may be cooled without necessarily changing phase to a liquid. The device is termed a turbocompressor, because it compresses the refrigerant (gas, etc.) via the rotation of a wheel-like spoked turbo fan that will be described in detail below. Likewise, the optional additional components termed a "turbocondenser" and "turboexpander" are called such because they accomplish condensation and expansion, respectively using a rotating apparatus.

I. Stationary Plenum Turbocompressor

Figure 1:
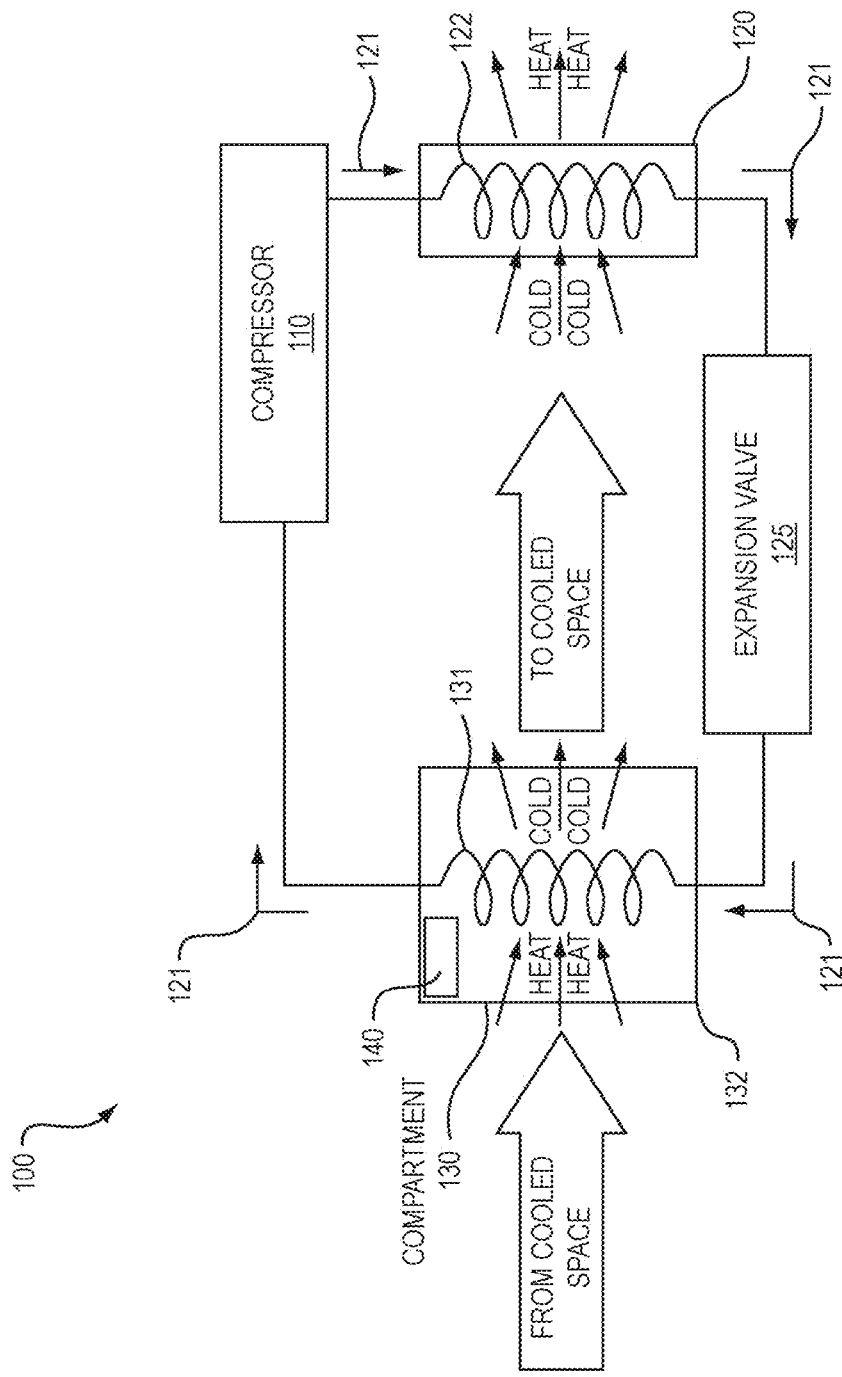
FIG. 1, already described, is a block diagram of an air-conditioning system comprising a compressor and a condenser according to a prior art arrangement.
Figure 2:
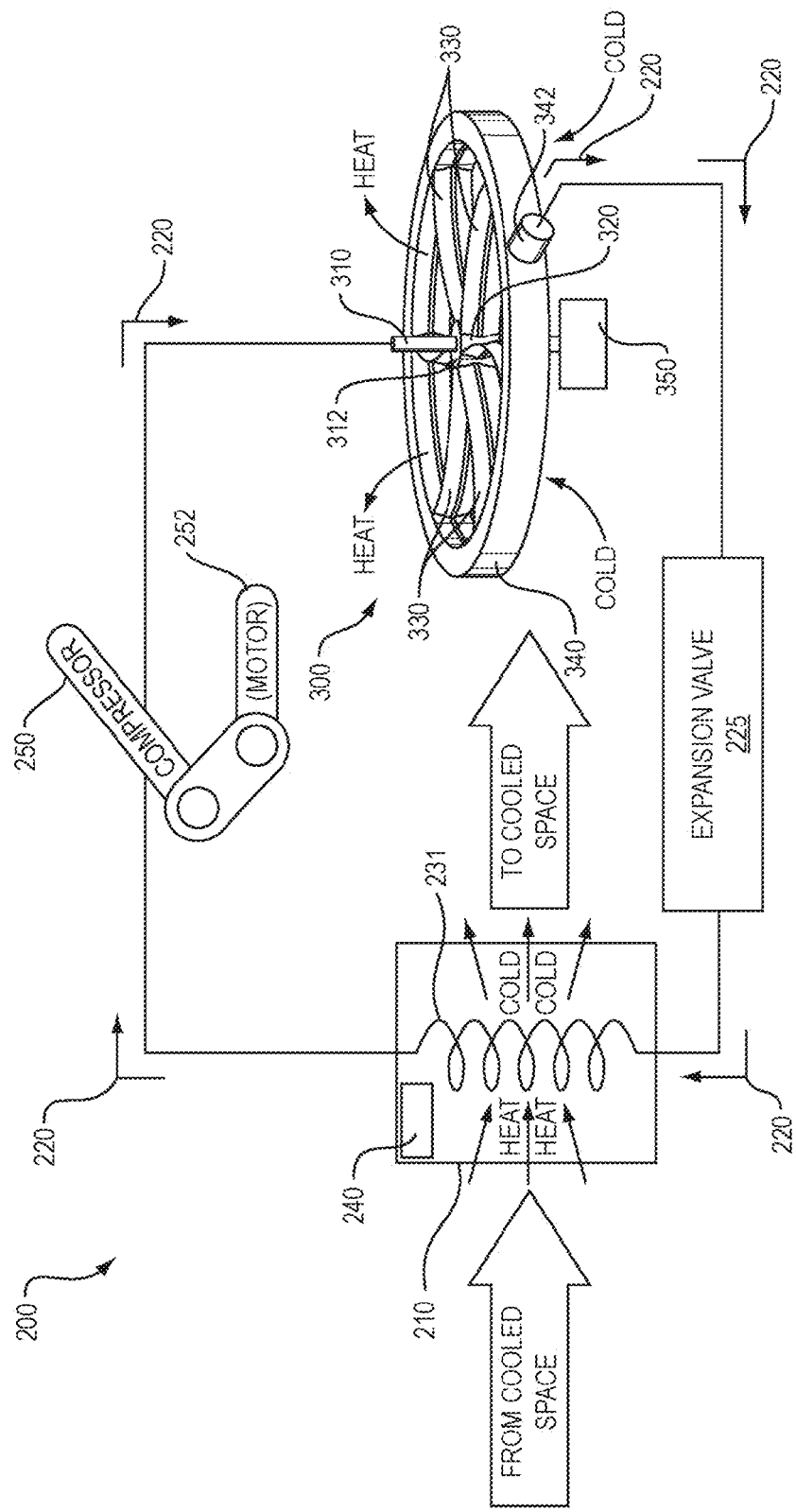
FIG. 2 is a block diagram of an air-conditioning/heat-exchange system including an isothermal compressor according to an illustrative embodiment.

FIG. 2 is a block diagram of an exemplary air-conditioning/cooling system loop 200 comprising a precompressor 250, an isothermal turbocompressor 300, an expansion valve 225 and an evaporator 210, connected sequentially by conduit 220. The precompressor 250 performs compression until the temperature of the refrigerant fluid rises to that of the warm compartment, typically that of the outside atmosphere. The isothermal compressor 300 completes the required compression while subjecting the refrigerant to simultaneous cooling (with possible condensation), keeping the temperature of the refrigerant close to that of the outside atmosphere. From the expansion valve 225, the expanded refrigerant then enters the compartment 210 where a flow ambient air (or another fluid) is passed through the compartment 210 possibly using a fan 240 or other source of flow. As described above, the fan 240 or possible other source of flow directs the air/fluid over coils 231 within the loop or circuit 200 to exchange heat from the air/fluid with the refrigerant as shown. Notably, the conventional compressor/condenser arrangement such as that illustrated in FIG. 1 (110), employing two devices in sequence to perform the two heat-transfer operations separately in a continual cycle (flow arrows 220) through the loop 200, has been substituted with a precompressor 250 and an isothermal turbocompressor 300 according to an illustrative embodiment. In operation, the (higher-heat) refrigerant, in its gaseous form, flows through the precompressor 250 and, in a partially compressed state, enters isothermal turbocompressor 300 via a stationary inlet tube 310, as described in greater detail below, with reference to FIGS. 3 and 4. The isothermal turbocompressor 300, as will be described in greater detail below, performs additional compression via centrifugal force exerted on a set of spokes spinning under the drive of an electrically (or other form of motive power) driven motor

350. Such compression occurs within the spokes 330 after refrigerant is relatively evenly distributed thereinto via the hub 320. The motor 350 can be single speed, multi-speed, or variable speed as appropriate. Likewise, the size and power of the motor is highly variable.

Notably, the isothermal turbocompressor 300 is constructed and arranged such that it also performs the cooling, which may or may not include associated condensation, by drawing air or other cooling fluid across the device. In this manner, the fluid output 220 of the isothermal turbocompressor 300 is a cooled, elevated-pressure refrigerant, similar to the output of a conventional compressor and condenser (110 and 120 of FIG. 1) combination, but accomplished using the precompressor 250 and isothermal turbocompressor 300, as opposed to a more-energy demanding compressor 110 and a separate device for performing the condensation of refrigerant in an air-conditioning system.

The precompressor in this embodiment can comprise an axial piston refrigerant compressor that is driven via a belt or other power transmission using a separate motor 252, or a drive assembly interconnected with the turbocompressor 300. The structure or the precompressor is highly variable. As will be described below, the precompressor can be integrated with the turbocompressor in various embodiments.

Figure 3:
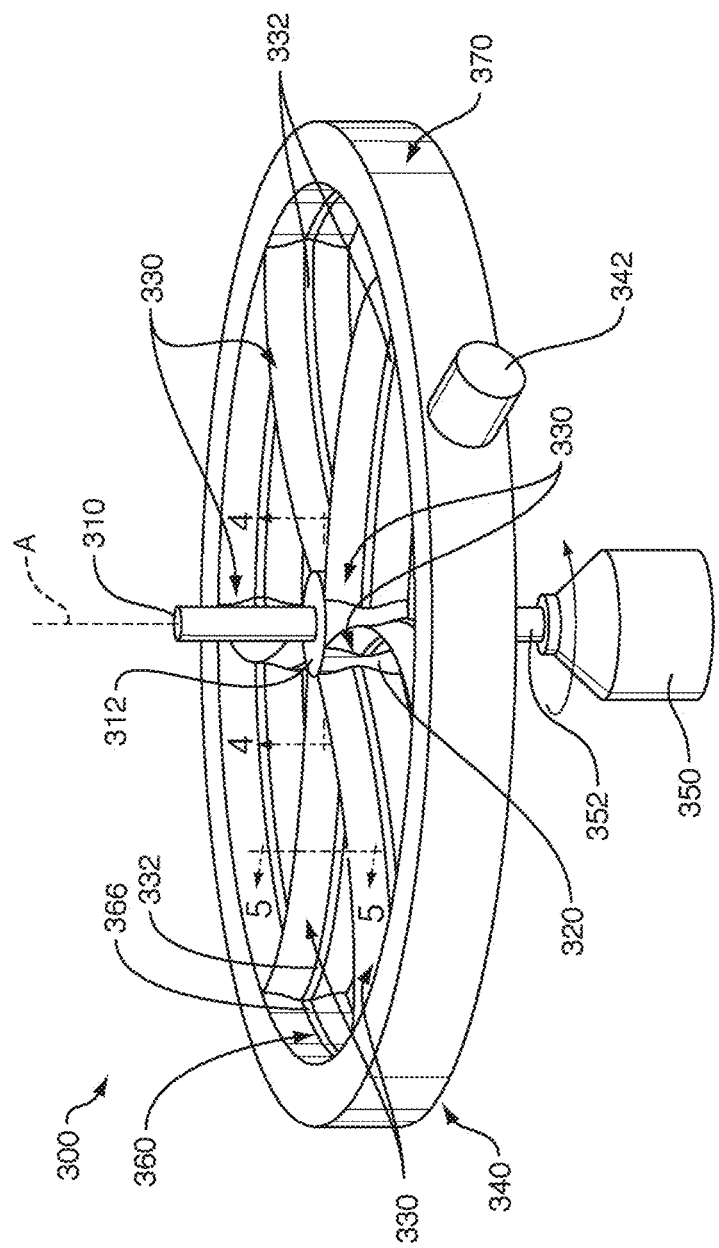
FIG. 3 is a more detailed perspective view of the isothermal compressor according to the illustrative embodiment.

More particularly, as shown in FIG. 3, which is a perspective view of the isothermal turbocompressor 300, the refrigerant flows under mass-flow pressure (initially generated by action of the precompressor and carried through the fluid loop) through an inlet tube 310 having a stationary, non-rotating inlet cap 312. The refrigerant collects in a central hub 320 that defines the rotating component of the isothermal turbocompressor 300. The inlet cap 312 and the central hub 320 have an appropriate seal therebetween (not shown in FIGS. 3 and 4) to prevent leakage of the refrigerant to the exterior, as will be described in greater detail below with reference to FIG. 8, which details the central-hub sealing components of the isothermal turbocompressor.

The isothermal turbocompressor 300 of the present embodiment further includes a plurality of spokes 330 extending radially outwardly from the central hub 320, that terminate at a shared circumferential (circular) rim 366 that affords the rotating component (hub 320, spokes 330 and rim 366 the general appearance of a spoked wheel. As shown, the illustrative wheel defines six spokes 330 that radiate outwardly from the central hub 320 at equal circumferential increments. However, in alternate embodiments the number of spokes is highly variable, and can depend, in part, upon the volume of airflow desired to achieve the cooling of the refrigerant during the air conditioning process. Likewise, a greater volume of refrigerant can be directed through an increased number of spokes. The movement of refrigerant through the spokes is now further described.

In this embodiment, the spokes 330 each define a spiral shape, when taken in plan (top or bottom) view. In alternate embodiments, they can define a straight or segmented shape, among other possible shapes, including three-dimensional shapes. By three-dimensional, it is meant that the spokes can deviate in part above and below a plane perpendicular to the rotational axis. As described further below, each of the spokes 330 supports at least one conduit, i.e. a tube or hollow passage 332 through which the refrigerant flows from the central hub 320 to an exterior plenum 340, where it is collected (described below), and then is expelled (under pressure) from the stationary plenum via an outlet tube 342.

The above-described electric motor 350 drives a shaft 352, and can be directly driven, or be part of a geared transmission. The shaft 352 rotates the central hub 320 (and thus also the interconnected spokes 330 and their outer rim 366). In operation, the rotation of the shaft 352 causes the central hub 320 and spokes 330 to spin, and the centrifugal force exerted on the central hub 320 and the spokes 330 thereby causes the refrigerant within the central hub to be outwardly driven through the tube or passage 332 in each of the spokes 330. The outward driving force thereby pressurizes the refrigerant (i.e. providing the compression stage of the cycle) at the plenum 340.

The spokes 330 can be formed in accordance with a spiral curve so that the angle at which the spoke attaches at the circumferential rim 336 can cause the circumferential (azimuthal) component of the velocity of the exiting refrigerant to negate, totally or partially, the rotational speed of the rim at that point. In this arrangement, the velocity of the refrigerant at the point of its entrance into the plenum is nearly radial and the kinetic energy associated with the unproductive circumferential speed is reduced or eliminated.

Figure 4:
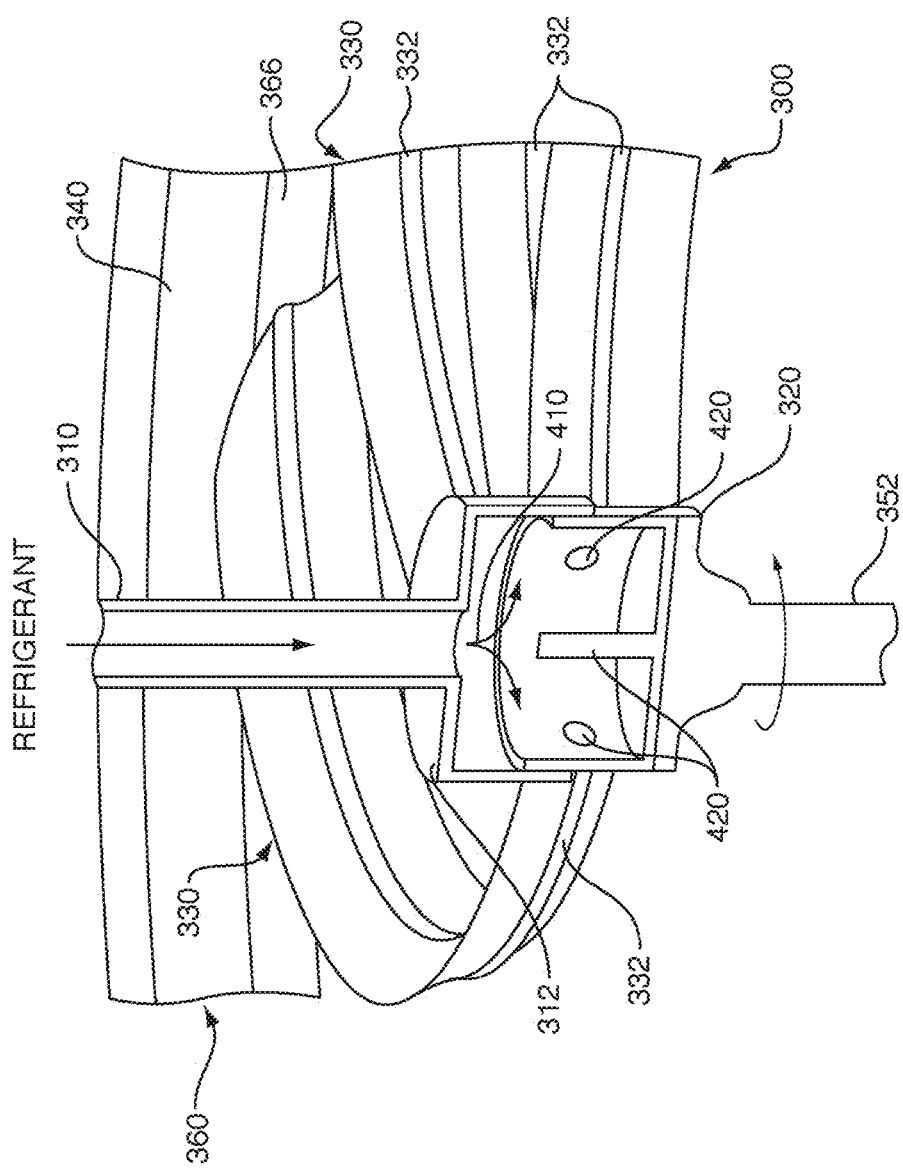
FIG. 4 is a cross-sectional view detailing a central hub of the isothermal compressor according to the illustrative embodiment, as taken along line 4-4 of FIG. 3.

With further reference to the passage of refrigerant from the inlet cap 312, into the spokes 330, FIG. 4 is a cross-sectional view of the stationary inlet cap 312 and rotating central hub 320 of the isothermal turbocompressor 300, as taken along line 4-4 of FIG. 3. The refrigerant enters the central hub 320 via an inlet tube 310 from the system's refrigerant loop (FIG. 2). In general, the turbocompressor drives the mass flow of refrigerant through the loop so as to provide a continuous flow cycle. From the inlet tube 310, the refrigerant enters the inner volume of the central hub 320. As described below, a rotational mechanical face seal (omitted in FIG. 4, but described in FIG. 8 below) between the hub 320 and inlet cap 312 prevents leakage of refrigerant to the environment from the inner volume of the hub 320 as it rotates with respect to the inlet cap 312. While a rotating mechanical face seal is employed (see FIG. 8) in an illustrative embodiment, any appropriate sealing technique can be employed to seal the refrigerant within the central hub 320 (and inlet cap 312).

As further illustrated in FIG. 4, the motor drive shaft 352 rotates the central hub 320 at a predetermined rate, and thus spins the attached, radially outwardly directed spokes 330. The spinning of the central hub 320 causes a centrifugal force to be applied to the refrigerant therein, which thereby causes the refrigerant to flow radially out of the central hub, in a direction of the arrows 410, through the holes or ports 420 in the hub wall. The holes or ports 420 respectively interconnect with each spoke conduit (i.e. the tube or passage 332) so that the refrigerant flows radially outwardly through each tube or passage 332.

Figure 5:
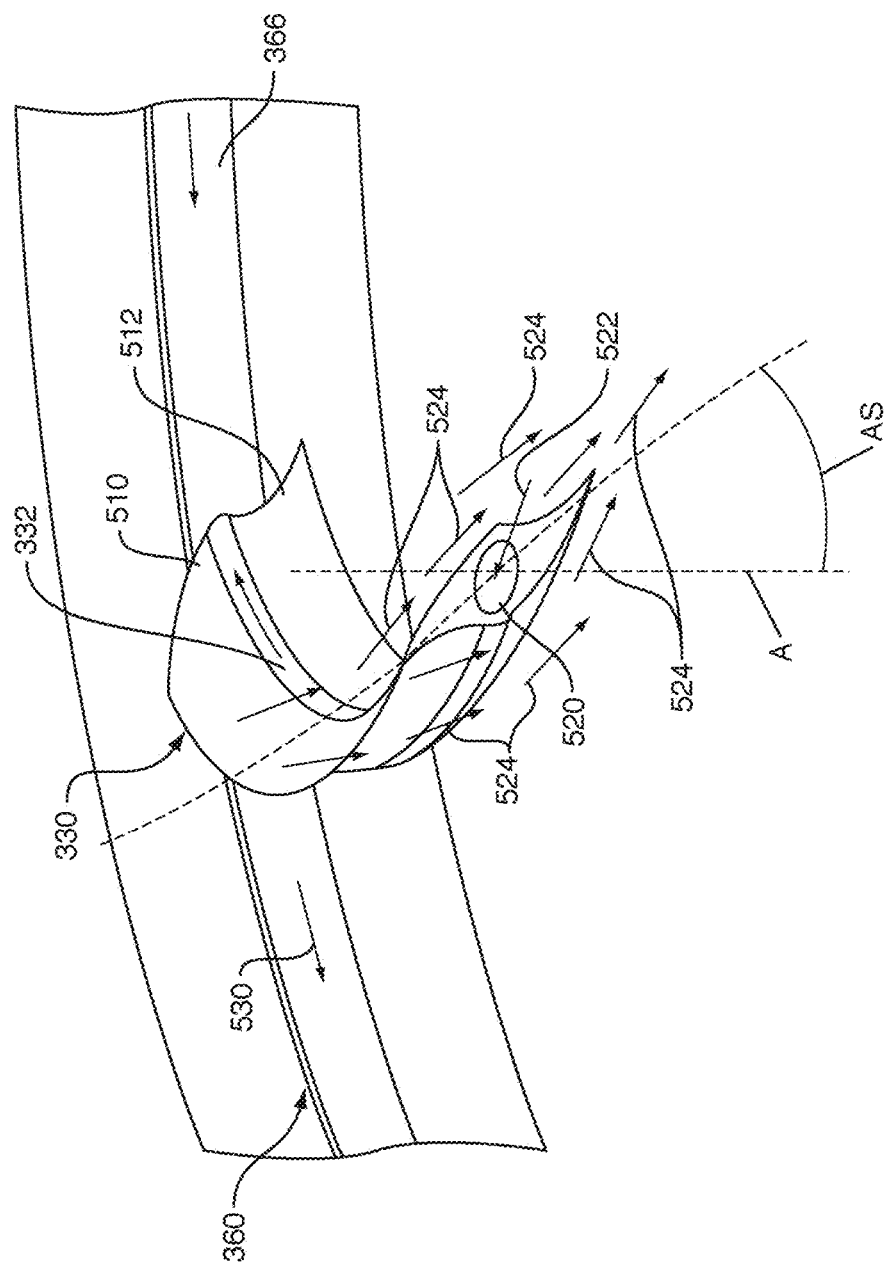
FIG. 5 is a cross-sectional view detailing a spoke of the isothermal compressor according to the illustrative embodiment, as taken along line 5-5 of FIG. 3.

As described in greater detail with respect to the cross-sectional view of FIG. 5, the spokes 330 each define a cross-sectional shape that includes a top fin section (or "top fin") 510 and a bottom, oppositely directed bottom fin section (or "bottom fin") 512, that together generate movement of the ambient air (airflow) via aerodynamic lift as the spokes are rotated. This airflow thereby draws air across the spokes of the isothermal turbocompressor in the manner of a fan as the motor 350 drives the hub 320. The airflow, having a temperature that is generally lower than that of the compressing refrigerant, causes the refrigerant to cool and possibly change phase to a liquid as it transfers heat to the cooler air drawn across it (i.e. the refrigerant can undergo a condensation cycle) in the depicted direction according to the arrows 524.

Note, as used herein, terms such as "up", "down", "side", "top", "bottom", "inside", "outside", and the like, are meant as conventions only and not as absolute directions/orientations. Also, the ambient air may be replaced by another fluid, including gas or liquid, suitably chosen to perform the cooling action.

The refrigerant flows through the hollow passage 520 of the depicted tube 332 (arrow 522) based on the rotationally induced centrifugal force. The spokes 330 are constructed and arranged such that they have an upper fin portion 510 and a lower fin portion 512 with the thickened central region containing tube 332 therebetween that together form a blade-like structure that, when in rotation, acts as a fan blade. The upper and lower fin portions 510 and 512 collectively form a slanted fin blade that generates lift, thereby impelling atmospheric air or another ambient fluid in the space between the spokes 330. The blade generally assumes a non-parallel and non-perpendicular (slant) angle AS with respect to the hub's rotational axis A (see also FIG. 3). This slant and cross-sectional geometry of the airfoil-like blade structure (along with the rotational speed of the hub) controls the volume of airflow (arrows 524), that is drawn past, and in contact with the spokes 330 to thereby conduct a certain amount of heat from the refrigerant passing within the tubes 332. The blade slant angle AS is highly variable, as is the cross section geometry of the blade. Also, while a tube 332 is located at the central region in this embodiment, it is expressly contemplated that the tube or other conduit(s) can be located more-adjacent to an upper or lower edge of the blade/spoke. For example, the tube can be placed closer to the leading edge of the airflow in an alternate embodiment.

The arrow 530 shows the exemplary rotation of the spokes 330 and rim 366 relative to an annular well 360 of the stationary plenum 340. This rotation, combined with the structure of the blade shape of the spokes 330, provides for the depicted airflow down and past the spokes. In this manner, the refrigerant transfers its heat to the cooler air that is being drawn toward the spokes by their rotation. In other words, the slanted, airfoil-shaped spokes 330 act as fan blades that can be rotated to provide a continuous flow of cooler air in contact with the surface thereof.

Figure 6:
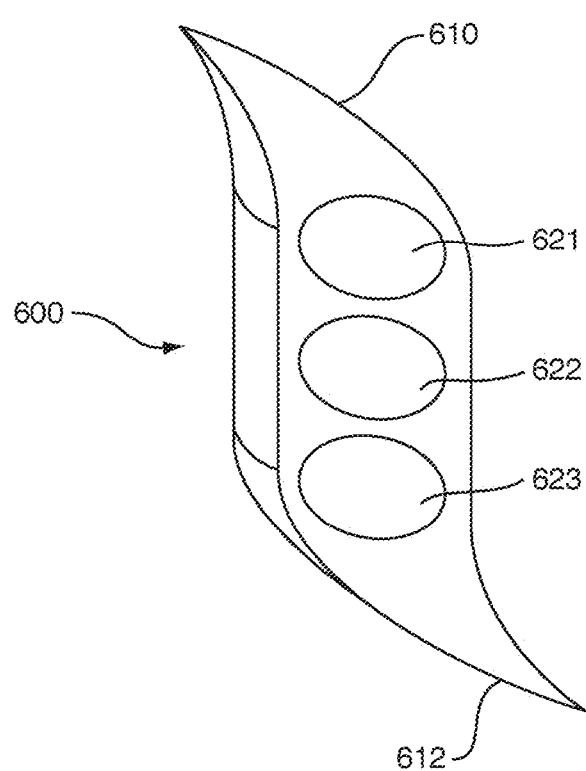
FIG. 6 is a cross-sectional view detailing a spoke of an isothermal compressor according to an alternate embodiment including a plurality of parallel tubes therein.

In alternate embodiments, it can be desirable to provide each spoke of the isothermal turbocompressor 300 with a plurality of oblong passages or tubes formed within its cross sectional structure. Providing a plurality of tubes or passages provides more contact area for the refrigerant with respect to the spoke's surface, and thereby increases the amount of heat transfer during compression. FIG. 6 shows a cross-sectional view of a multi-tube spoke 600 according to an alternate embodiment. As shown, the spoke defines an upper fin portion 610 and a lower fin portion 612, which each taper in opposing directions to generate lift during rotation. This lift draws air across the blades as described above to thereby cool the refrigerant. The fin portions 610, 612 can define any shape, but illustratively extend in opposing directions as identical, mirror-imaged airfoils as shown. An asymmetric airfoil that optimizes air movement in a given direction can be provided in alternate embodiments hereto. The cross-sectional shape of the spoke/blade 330, 500 in the embodiments herein can be angled in an opposing direction so as to direct airflow in an opposing direction for a given rotational direction.

Notably, the illustrative spoke 600 includes a plurality of tubes or passages 621, 622 and 623 within its cross section through which refrigerant flows to undergo the compression cycle of an air conditioning or refrigeration process. As described, a plurality of tubes potentially increases the cross sectional area of the overall refrigerant conduit in each spoke without overly increasing the thickness of the spoke's blade geometry (and thereby reducing its lift properties or increasing its aerodynamic drag). This allows for greater refrigerant surface area in contact with the heat-conducting surface of the spoke and a higher refrigerant mass flow rate, or alternatively a slower flow of refrigerant at equal overall mass flow rate, thereby increasing the isothermal turbocompressor's cooling capacity and its degree of heat transfer. In general, this multi-tube arrangement can permit the given flow volume of refrigerant to transfer increased heat when compared to a single passage/tube embodiment to thereby further improve compressor efficiency. Additionally, if several passages are provided through each spoke, then these tubes can define varied diameters or varied cross-sectional shapes within the same spoke (for example, a larger circular tube in the center flanked by a pair of smaller elliptical passages—one smaller passage located adjacent to each fin edge). A multi-tube blade can also be customized for particular applications by varying the number of tubes provided within each spoke. That is, in some embodiment, two tubes can be employed, in other embodiments, 4 or 5 tubes can be employed (for example). The cross section shape and overall area of an individual tube or passage can also vary along its length along the spoke, being, for example, wider near the entrance and progressively narrower down the length of the spoke to concentrate the fluid as it becomes pressurized.

It should be clear that a wide range of possible passage shapes and arrangements can be defined within the walls of the spoke. Likewise a variety of flat shapes, symmetrical airfoils and asymmetrical airfoils with tan appropriate slant angle (or range of slant angles) can be employed. In general, internal passage shapes that allow greater contact between the fluid and the surface area of the passage, and/or those that provide a thinner wall between the cooling fluid and the fluid are often desirable to increase heat transfer. In further embodiments, the spokes can define a variable geometry in the manner of a variable-pitch aircraft propeller to increase or decrease airflow (and heat transfer) for a given motor rotation rate. Electromechanical actuators, steppers, servos or solenoids operatively connected to the hub and/or the rim can effect the change in pitch/slant angle. Other devices, such as intake or outflow louvers, placed in line with the turbocompressor's air/fluid flow can also be used to vary the flow across the spokes.

Referring again to FIG. 3, the outer rim 366 that surrounds the spokes 330 rides within a circumferentially annular well or groove 360 of a circular, stationary plenum 340 of the isothermal turbocompressor 300. The pressurized refrigerant exits the spokes 330 via through-holes or ports in the rim 366, shown in greater detail in the cross section of FIG. 7. The refrigerant flows from the through-holes 730 to be collected in the stationary plenum 340 at an annular conduit 720 that forms a radial-outward coaxial extension of the annular well 360. The through-holes or ports 730 are typically provided in numbers and shapes that accommodate the number and shapes of passages at their terminal point of the spokes (according to the various geometries contemplated herein), in order to provide smooth passage of the refrigerant into the plenum 340. The cross-sectional shape of the annular conduit 720 that receives refrigerant from the through-holes 730 is also highly variable, and by way of example, is depicted as a rectangular cross section.

The illustrative annular well 360 of the stationary plenum 340 defines a height HW that is sufficient to allow the height HR of the rim 366 to rotate within the stationary plenum 340. Appropriate mechanical face seals are used to prevent refrigerant loss as the rim 366 rotates with respect to the plenum 340, as will be described in greater detail below with reference to FIG. 9. The high-pressure, cooled refrigerant exits the stationary plenum 340 via at least one outlet tube (the above-described outlet 342 shown in phantom in FIG. 7) located along the plenum's outer wall 370, or another plenum wall (e.g. the top and/or bottom plenum walls), and in fluid communication with the conduit 720. The pressurized, cooled refrigerant can thereafter be drawn through an expansion valve (225) that reduces its pressure and temperature, such that the refrigerant may absorb the warm air within a compartment as performed in conventional air-conditioning and other cooling systems. Note, in an alternate embodiment, the pressure-reducing expansion valve may be incorporated in the isothermal turbocompressor (for example, as a component placed along outlet tube 342 or components affixed to each of the several through-holes 730 along the rim 366).

As described below in greater detail, with reference to FIG. 9, the rim 366 is sealed within the stationary plenum 340 using an accompanying rotating mechanical face seal therebetween so as to retain the pressurized refrigerant within the well 360 and circumferential conduit 720 of the stationary plenum 340.

Note that the spokes 330, hub 320 and rim 366 can be constructed from a material as a unitary fan/wheel structure (for example, an aluminum casting), or from a plurality of materials that are assembled together to form the fan structure. In general, the fins are desirably constructed from a material with relatively high thermal conductivity, such as metal. Other components, such as the rim 366, can be constructed from other materials where appropriate, such as a composite. However, the material choice for the fan and other elements of the turbocompressor is highly variable. Such materials are generally selected for cost, ease of working, ability to withstand pressure and mechanical stress (for example, the stresses imparted by centrifugal force), durability, and thermal properties.

Figure 8:
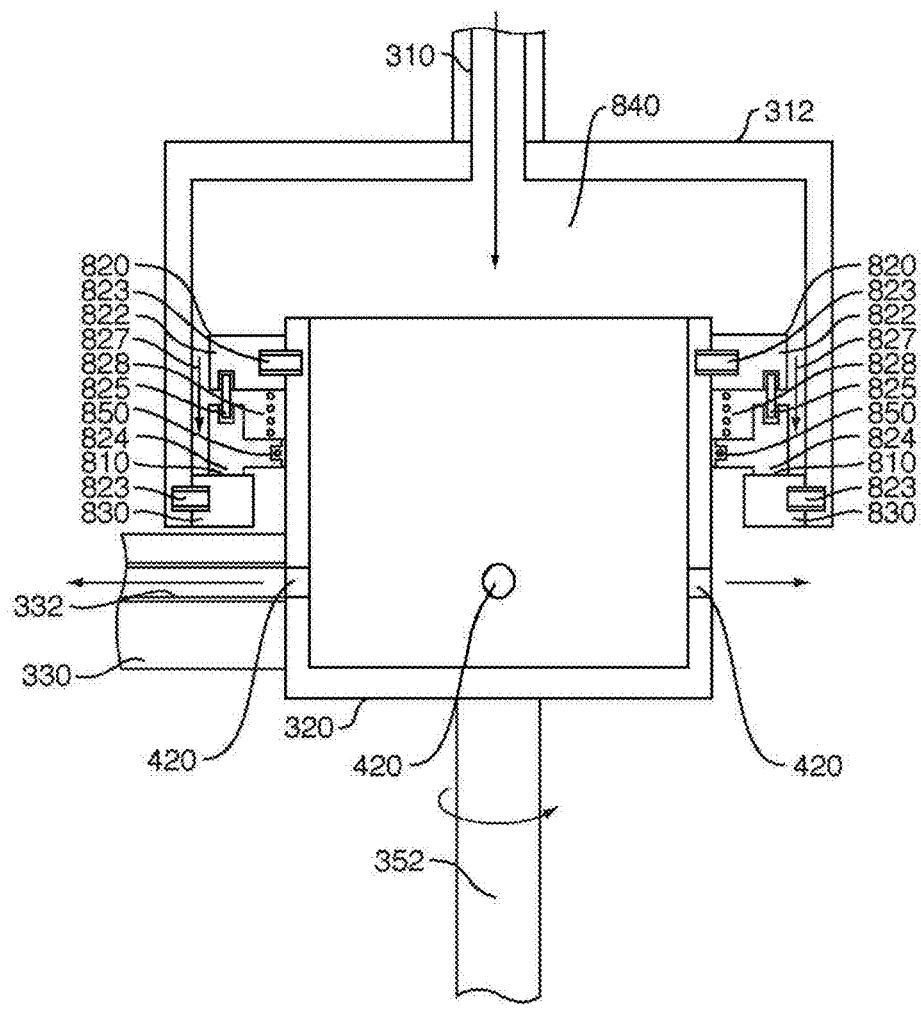
FIG. 8 is a more-detailed illustration of the cross-sectional view of FIG. 4, showing exemplary sealing components according to an illustrative embodiment.
Figure 9:
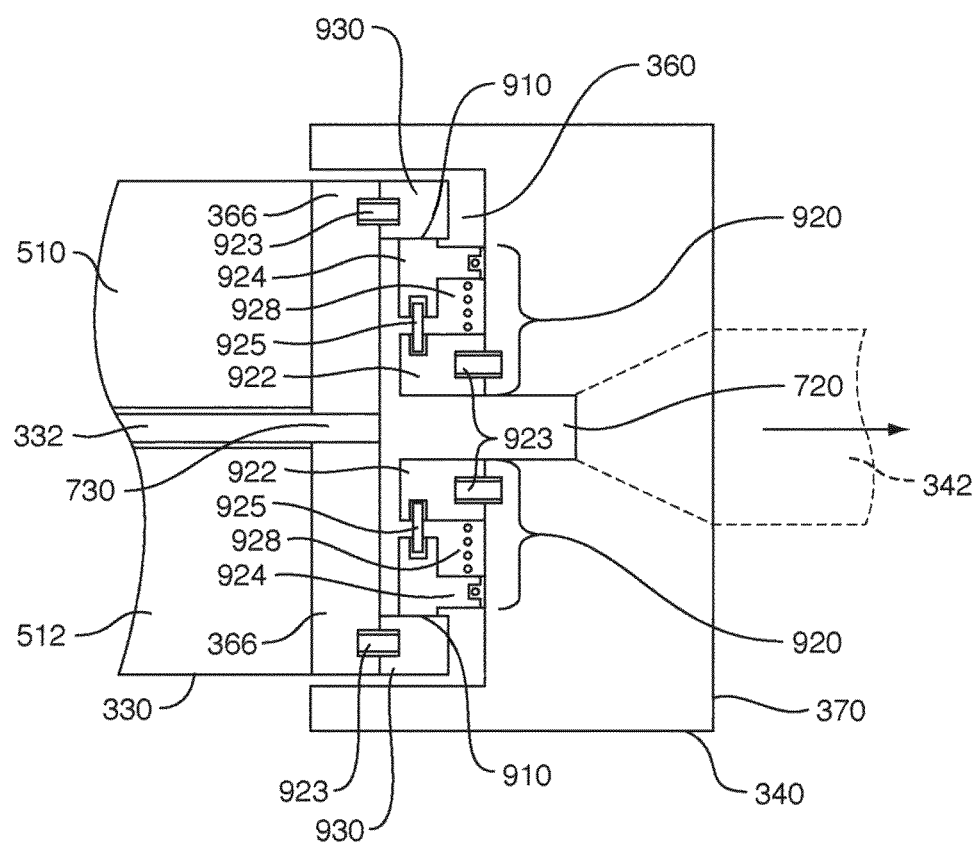
FIG. 9 is a more-detailed illustration of the cross-sectional view of FIG. 7, showing exemplary sealing components according to an illustrative embodiment.

FIGS. 8 and 9 detail rotational seals provided, respectively at each of the hub 320 and the plenum 340 according to an illustrative embodiment of the isothermal turbocompressor 300. As shown, the illustrative seals are known generally to those skilled in the art as mechanical face seals. Mechanical face seals generally comprise seals that employ a spring-loaded/fluid-pressure-biased primary ring, as will be described, and a mating ring, to provide a slidable sealing surface therebetween which serves to maintain pressurized liquids and/or gases from leaking away from the volume in which they must remain confined. In general, the axially-movable primary ring is secured to one rotating member while the mating ring is axially fixed, and secured to the opposing rotating surface. The primary and mating rings confront each other along a circumferential sealing face that defines a relatively low-friction, sliding interface therebetween. One ring may be constructed of a softer material than the other to prevent abrasion that can eventually cause fluid leakage through the interface. The primary ring is typically biased toward the interface by a spring to maintain the seal while the components are stationary (non-rotating), and is arranged so that increased fluid pressure forces the primary ring to bear more forcibly against the mating ring to enhance the seal at higher pressures. By way of further background mechanical face seals, for use according to illustrative embodiments herein are shown and described in, *PRINCIPLES AND DESIGN OF MECHANICAL FACE SEALS*, by Alan O. Lebeck (1991). This reference should provide a general guide to the reader on the construction of a variety of commonly employed mechanical face seals for use in rotating assemblies, which require fluid to be maintained within the enclosed space between the rotating components.

FIG. 8 is a more-detailed illustration of the cross-sectional view of FIG. 4, showing exemplary sealing components located between the rotating central hub 320 and the stationary inlet cap 312. The primary ring 820 is fixed about the central hub 320 and provides compensation and flexibility to allow for small relative axial and angular motion of the relative parts. The primary ring 820 comprises a base ring 822 that is fixed about the central hub 320 (as shown by the fasteners or pins 823 denoting attachment to the adjacent structure) and a primary seal ring 824. The fixed components can be attached by any acceptable attachment mechanism. The primary ring 820 is generally sealed from infiltration via a flexible annular cover 825 that extends between the base ring 822 and the seal ring 824 so as to cover a series of biasing springs 828 therebetween equally spaced around the circumference of the central hub 320. The primary ring 820 is biased by the springs 828 in a downward direction (arrow 827) to create the sealing surface 810 between the primary ring 820 and the mating ring 830. The mating ring 830 is, thus, fixedly attached (by exemplary pins 823) to the inner surface of the stationary inlet cap 312. As shown, a planar, annular sealing surface 810 is thereby provided between the biased primary ring 820 and a mating ring 830. The springs 828 bias the seal ring 824 of the primary ring 820 into contact with the mating ring 830 to seal the refrigerant within the isothermal turbocompressor and to prevent potential leakage while the components are stationary. As loop pressure is generated during compressor operation, the arrangement of the seal ring 824 with respect to the volume space 840 causes the pressure to bias downwardly (arrow 827) on the seal ring 824, so as to increase its engagement pressure against the mating ring 830. Note that a secondary seal (O-ring 850) can be provided against the outer wall of the hub 320. This seal 850, along with the flexible connection between the base ring 822 and sealing ring 824, allows for small axial and radial movement of the hub and inlet cap with respect to each other.

The mechanical face seal arrangement, as shown in FIG. 8, allows the rotating central hub, as fixed on the shaft 352, to rotate within the inlet cap 312, while sealing the refrigerant therein. A similar mechanical face seal arrangement is provided to seal refrigerant collected within the stationary plenum 340, as the rim 366 rotates therein, which is now described in further detail.

Figure 7:
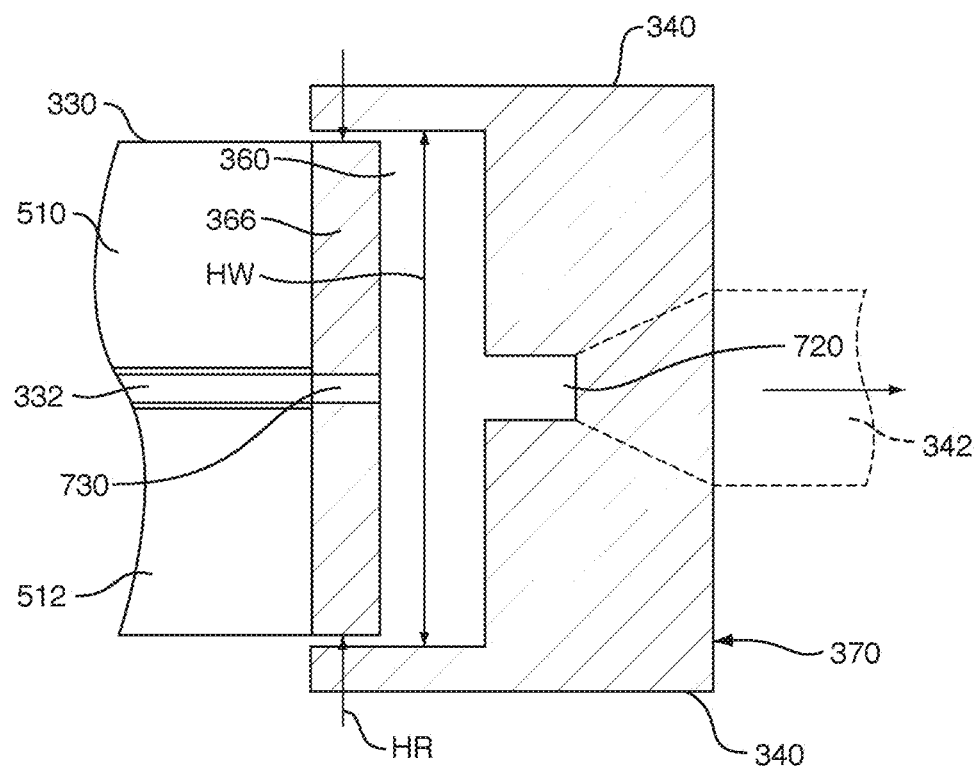
FIG. 7 is a cross-sectional view detailing the junction between a spoke and a stationary plenum of the isothermal compressor according to the illustrative embodiment.

FIG. 9 is a more-detailed illustration of the cross-sectional view of FIG. 7, showing exemplary sealing components that provide a sealing surface 910 between the rim 366 and the circumferential annular well 360 of the stationary plenum 340. In an illustrative embodiment, the exemplary sealing mechanism employed between the rim 366 and the well 360 is also a rotating mechanical face seals, similar to that described with reference to FIG. 8 above. However, any acceptable seal that allows for the containment of fluid under pressure while a pair of components rotate with respect to each other can be employed in alternate embodiments As shown, a pair of opposing mechanical face seals is employed between the rim 366 and the well 360. Each of these seals includes a primary ring 920, comprising a fixed base ring 922, which is attached to the stationary plenum 340 (pins 923). The primary ring 920 further comprises an axially movable seal ring 924 which contacts the mating ring 930, fixed to the ring 366, to seal the refrigerant within the stationary plenum. The primary ring 920 is sealed with a cover 925 to resist infiltration of the refrigerant therein, and further comprises a spring 928 (or multiplicity of discrete springs positioned about the circumference), which biases the primary seal in a direction against the mating seal 930.

The mating ring is attached to the ring 366 (pins 923), and provides for the slidable seal interface 910 so as to prevent unwanted leakage of the refrigerant from the stationary plenum. This seal is highly desirable to retain the refrigerant in the stationary plenum so that it may be directed out of the stationary plenum via outlet tube 342, such that it may be employed by an air-conditioning or other cooling, heat-pumping, or heat-exchange arrangement.

Note that the mechanical face seals depicted are only meant to show an example of a possible seal arrangement for use with the components of this embodiment, and any acceptable technique known to those of skill in the art for appropriately sealing the refrigerant within the compressor at its points of motion is expressly contemplated. Seal arrangement other than, or in addition to, the depicted mechanical face seals are expressly contemplated. Likewise, while not shown, the hub 320 and the rim 366 can each be supported by appropriate bearing structures that ensure an aligned and low-friction rotation between these elements and the respective stationary components (inlet cap 312 and plenum 340). In general a variety of bearing structures and/or sealing mechanisms can be provided between the inlet cap 312 and plenum 340. Implementations of such bearing structures and/or sealing mechanisms should be clear to those of ordinary skill in the art.

Figure 10:
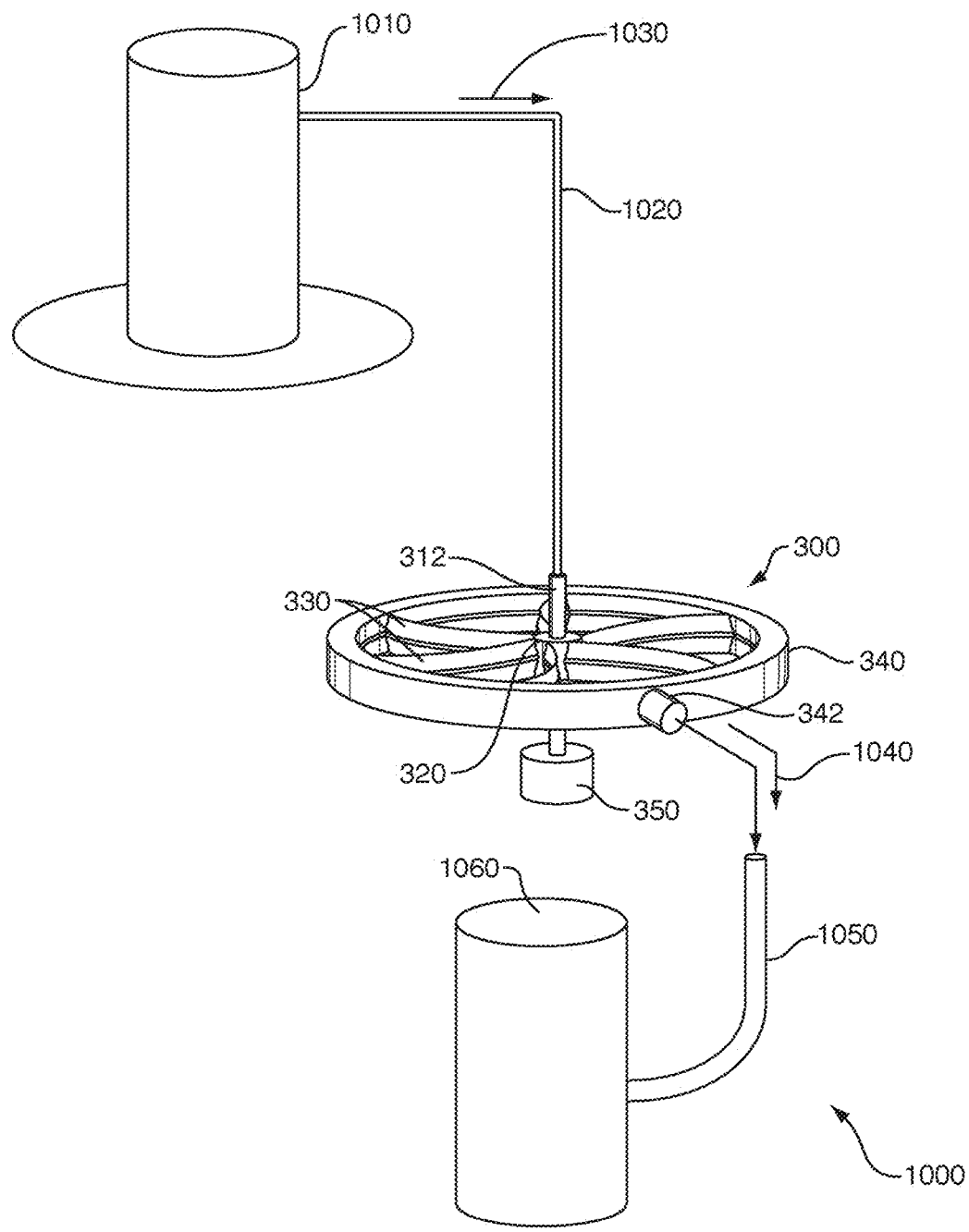
FIG. 10 is a schematic diagram of an illustrative point-to-point fluid circuit in which the turbocompressor is employed to cool and pressurize a gas.

With reference now to FIG. 10, the illustrative turbocompressor 300 is shown installed in a non-cyclical fluid circuit 1000. In this example, the (simplified) circuit 1000 is a natural gas pipeline that originates at a gas source (either a well or terminal) 1010 and extends to the illustrative turbocompressor 300 (sized and arranged appropriately to a gas pipeline application) via a pipe or conduit 1020 through which the gas flows (arrow 1030). The turbocompressor 300 is operated to increase the incoming gas' pressure, while simultaneously cooling it in an isothermal, or near-isothermal process so that it can be more-efficiently transferred (arrow 1040) from the compressor outlet 342 to a pipeline 1050. The exemplary pipeline 1050 directs the cooled (but typically non-liquefied) and pressurized gas to a storage tank 1060 or other destination. It is contemplated that a variety of intermediate valves, conduits, devices, and the like can be interposed between the source (1010) and destination (1060), including additional turbocompressor stages. This example is one of a variety of non-refrigeration-based applications in which the illustrative turbocompressor of this invention can be employed. Thus, as used herein and as described above, the term "refrigerant" is taken broadly to include a cooled gas transported through the turbocompressor in a point-to-point circuit.

More generally, while the turbocompressor of this invention is well-suited to applications such as domestic or automotive air-conditioning, heat-pumping, refrigeration and/or cooling, the use of the illustrative isothermal turbocompressor in a variety of types and scales of applications is expressly contemplated. In a typical application, however, the diameter of the spoke/fan portion is in an approximate range of 20 inches to 6 feet, while the external area of each spoke is approximately 0.1 to 4 square feet, and the number of spokes is approximately in the range of 6 to 24. Operating in a rotational speed range of approximately 400 to 2000 RPM, using a motor of approximately 0.5 to 2 HP, the unit should be able to accomplish heat transfer in a range of approximately 100 to 400 BTUs per minute. Of course, these parameters are only exemplary of a wide range of size and/or performance specifications for the turbocompressor of this invention.

While the use of the illustrative turbocompressor in a cooling application is shown and described above, it is expressly contemplated that the efficient isothermal properties of the compressor can be employed in a heating application—for example, in a heat pump embodiment. Accordingly, the "heat" shown exhausted from the turbocompressor 300 in FIG. 2 can be ducted or otherwise collected in a heating arrangement, and used to heat a desired object or space in accordance with conventional techniques.

Figure 11:
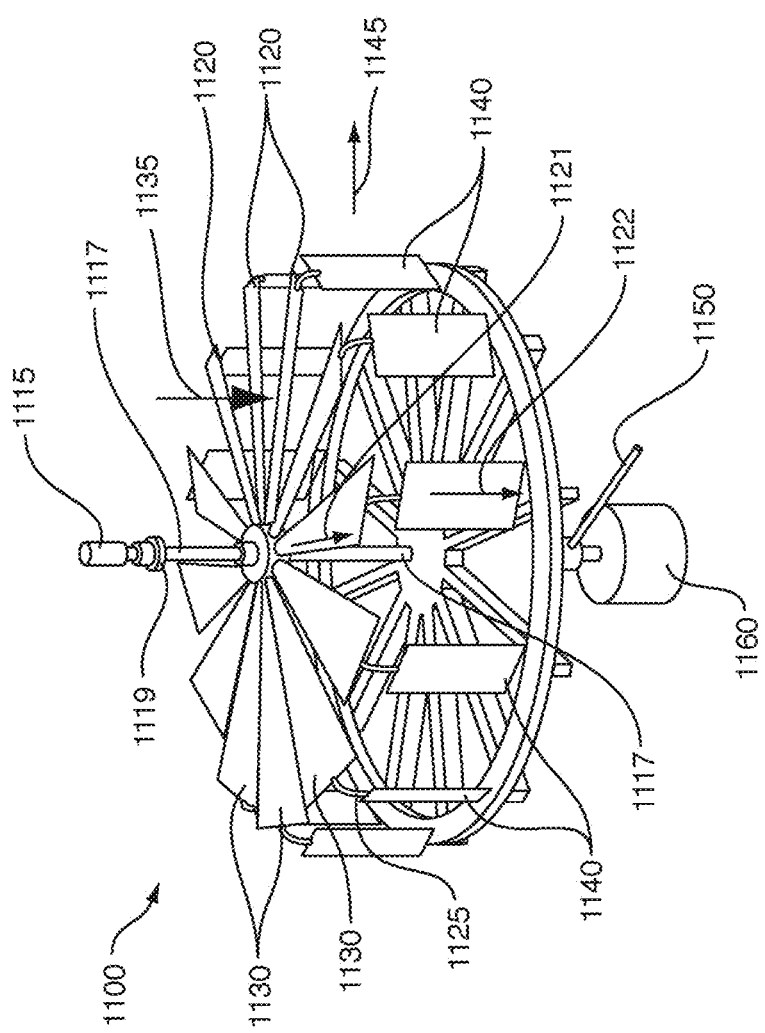
FIG. 11 is a top perspective view of a turbo-compressor-condenser-expander comprising an open framework and a fluid circuit that extends from and returns to a hub according to an illustrative embodiment.

II. Turbo-Compressor-Condenser-Expander with Open Frame Dual-Spoke Frame Structure The open framework structure shown in FIGS. 11-14 avoids design challenges resulting from implementing a stationary plenum and associated mechanical face seal arrangement requiring a large-diameter external seal. It also permits additional heat transfer (with possible condensation) and expansive decompression. An illustrative embodiment is shown which provides an isothermal turbo-compressor-condenser-expander (ITCCE) 1100 of FIG. 11. As shown, a precompression hub 1110 (the structure and operation of which is described further below) is at the center of the ITCCE 1100, in to which refrigerant flows to undergo a preliminary compression during the refrigerant cycle. The precompressed refrigerant then enters the ITCCE 1100 through a stationary inlet tube 1115 and down through a central passage in the axle 1117 to the first, inlet central hub 1110. As shown in greater detail in FIG. 14, precompression can be alternately implemented using, for example, a separate, discrete axial piston refrigerant compressor connected by conduits within the refrigerant loop. By way of example, this separate precompressor can be a type used in a conventional air conditioning/refrigeration system application. As described further below, the precompressor increases the refrigerant temperature, and allows it to flow into the turbocompressor stage at an appropriate temperature and pressure.

Referring back to FIG. 11, a plurality of spokes 1120 extend radially outwardly from the central hub 1110 in the form of a wheel-like spoke frame structure. As shown by arrow 1121, during rotation of the spokes, refrigerant is impelled through radial fins or blades 1130 to a maximum point of pressure and temperature at the ITCCE perimeter 1125. In an illustrative embodiment, by way of example, the overall framework has a diameter of approximately 3-4 feet at its perimeter and a height (axially) of approximately 6-16 inches. However, the size of the framework is highly variable and the dimensions provided above for the stationary plenum embodiment can also be applied to this embodiment. The fins or blades generate an airflow over their surface to promote air exchange as they rotate during operation. As used herein, the term "spoke" can refer interchangeably to a complete structure defining an integral blade and internal passage, pipe or conduit, or can define an underlying framework structural member to which a conduit and/or blade are attached. As shown, the blades are mounted on, or surround, the spokes of the framework and associated conduits. The blades are in thermal contact with the conduits in each embodiment. The radial blades 1130 promote the air exchange as shown by the arrow 1135 indicating the force of drawing ambient outdoor air down through the ITCCE 1100. The refrigerant then flows down through axial blades 1140 as shown by arrow 1122. The blades 1140 further promote significant air exchange (and resulting isothermalism of the possible condensation of the refrigerant) by improving the amount of heated air that is expelled, as shown by arrow 1145. In an alternate embodiment, the orientation of the blades 1130 and 1140 may be modified or the direction of rotation of the device reversed to force the air to follow a path opposite to that described by arrows 1135 and 1145.

The elbows connecting the terminal ends of the axial blades 1130 to the entrance ends of the axial fins 1140 may possibly be interconnected by a solid rim to increase the physical rigidity to the device.

These fins are typically two to eight inches wide, and their width may be uniform from one side to another. A variable width of the fins is possible and expressly contemplated. It is desirable that the materials used for fins 1140 possess high thermal conductivity but may otherwise be highly variable. The fins can be single faced with a single piece of sheet metal or other material. They can be encased in a thermally conductive material, as shown in the illustrative embodiments.

The blades or fins according to illustrative embodiments can be sized and arranged to be no more than approximately half the diameter of the device, as well as constrained as to not be so large that the resultant structure is insufficiently open, so as to admit and expel the desired quantity of air for heat exchange. In an example, a ratio a maximum solid surface (blade surface, adjacent framework, etc.) to open voids can be approximately of 70%. The dimensions should generally allow sufficient extended surface to reject the heat from the refrigeration process. In an illustrative embodiment, there are provided twelve radial trapezoidal (basically triangular) perimeter-shaped blades measuring approximately 1 inch wide adjacent to the first central hub and approximately 6 inches wide at the outer perimeter, and having a radial length of approximately 15 inches. The axial blades are generally rectangular in perimeter shape, measuring approximately 8.5 inches (in the axial direction and 4 inches wide. As depicted, the radial and axial blades can be canted at an angle with respect to a tangent line of the framework's circular outer perimeter (for example 3-7 degrees) to enhance air movement through the framework, in the manner of an impeller fan. As to materials of construction, one would not want to be unduly limited, but thermal conductivity is an essential aspect to promote heat transfer between refrigerant flowing inside the blades and air impelled on the periphery of the blades.

The geometry and structure of the blades are highly variable to attain the desired heat transfer characteristics depending on the surrounding system, leading to the condensation if so desired. The blades can be hollow such that refrigerant fills the entire blade to undergo compression. The blades can be formed of a molded structure that is solid or semisolid having one or more conduit therethrough, for example as shown in FIG. 6 showing multiple conduits through a solid blade-shaped spoke. In each embodiment, the blade is in thermal communication with the conduit.

The surface of the blades is also highly variable, and can range from a flat smooth surface, to a textured surface for increased surface area and structural integrity. The surface can be textured or rippled according to the illustrative embodiments.

Figure 12:
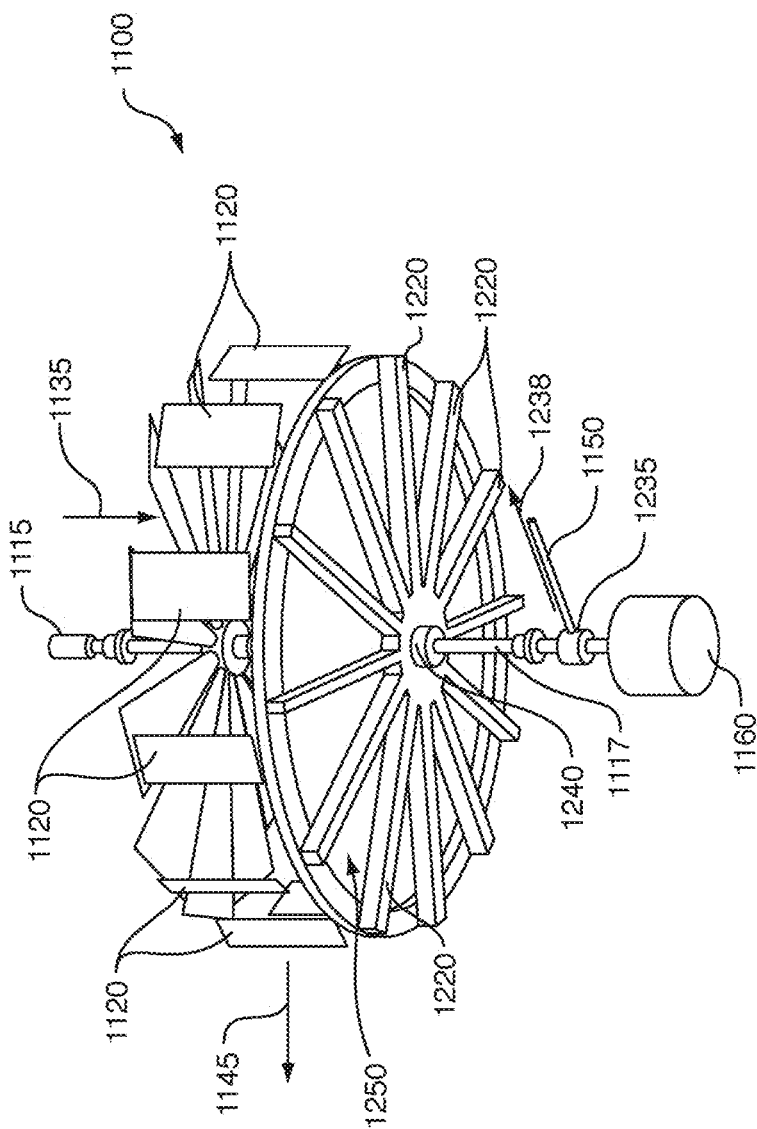
FIG. 12 is a bottom perspective view of the turbo-compressor-condenser-expander according to the illustrative embodiment.

After passing through the blades 1140, the refrigerant then travels through conduits in supported by the second set (the lower set as depicted) of spokes of the ITCCE 1100 (shown as spokes 1220 in bottom view of FIG. 12). The refrigerant then exits through a stationary outlet tube 1150. The motor drive 1160 rotates the central axle 1117 of the ITCCE 1100 at a desired rate, ranging between several hundred to two thousand revolutions per minute (RPMs), to rotate the spokes of the device such that the refrigerant undergoes centrifugal force for decompression during refrigeration or another heat exchange cycle. In this embodiment, the motor 1160 is shown, by way of example, located in an inline configuration driving the axle 1117. In alternate embodiments, such as described further below, the motor can be interconnected via a gear train, belt-and-sheave assembly, or other appropriate power transmission mechanism. The motor can be driven at a constant or a variable speed of rotation.

As shown in FIG. 12, the refrigerant flows through the conduits of the lower spokes 1220 to undergo decompression into a lower pressure, lower temperature fluid, as it flows into an outlet, central hub 1240. The refrigerant then flows coaxially with the central axle 1117 and into a stationary outlet collection space 1235.

The lower spokes 1220 may be straight or curved. It is desirable that the spokes 1220 be made of a thermally resistant material in order to minimize heat transfer with the surrounding air. Alternatively, they may be enveloped in a thermally insulating material, either singly or together. The spokes may otherwise be made from a variety of materials. The set of spokes 1220 and their insulation may be embedded inside a solid matrix (not shown in the illustration) so that the exterior surface of the lower wheel be smooth and offer low aerodynamic resistance while in rotation. Alternatively, the embedding matrix may serve as the thermally insulating material.

The ITCCE 1100 includes a covering disc 1250 on its bottom side, under which the lower spokes 1220 pass, to maintain stability of the ITCCE 1100 and improve structural strength (as well as to isolate the adjacent radial conduits from airflow generated by the axial and radial blades 1220, 1130). However, in further illustrative embodiments, the disc can be removed leaving only a spoke arrangement. The conduits of the second, lower spoke arrangement performs the expansion of the refrigerant as it flows back to the central axis of the ITCCE 1100. This decompression generates a physical torque that is similarly directed to the rotary movement of the device, thereby providing mechanical energy that contributes to the spin of the jointly rotating members of the ITCCE 1100 and decreasing the mechanical energy exerted by the motor drive 1160

Figure 13:
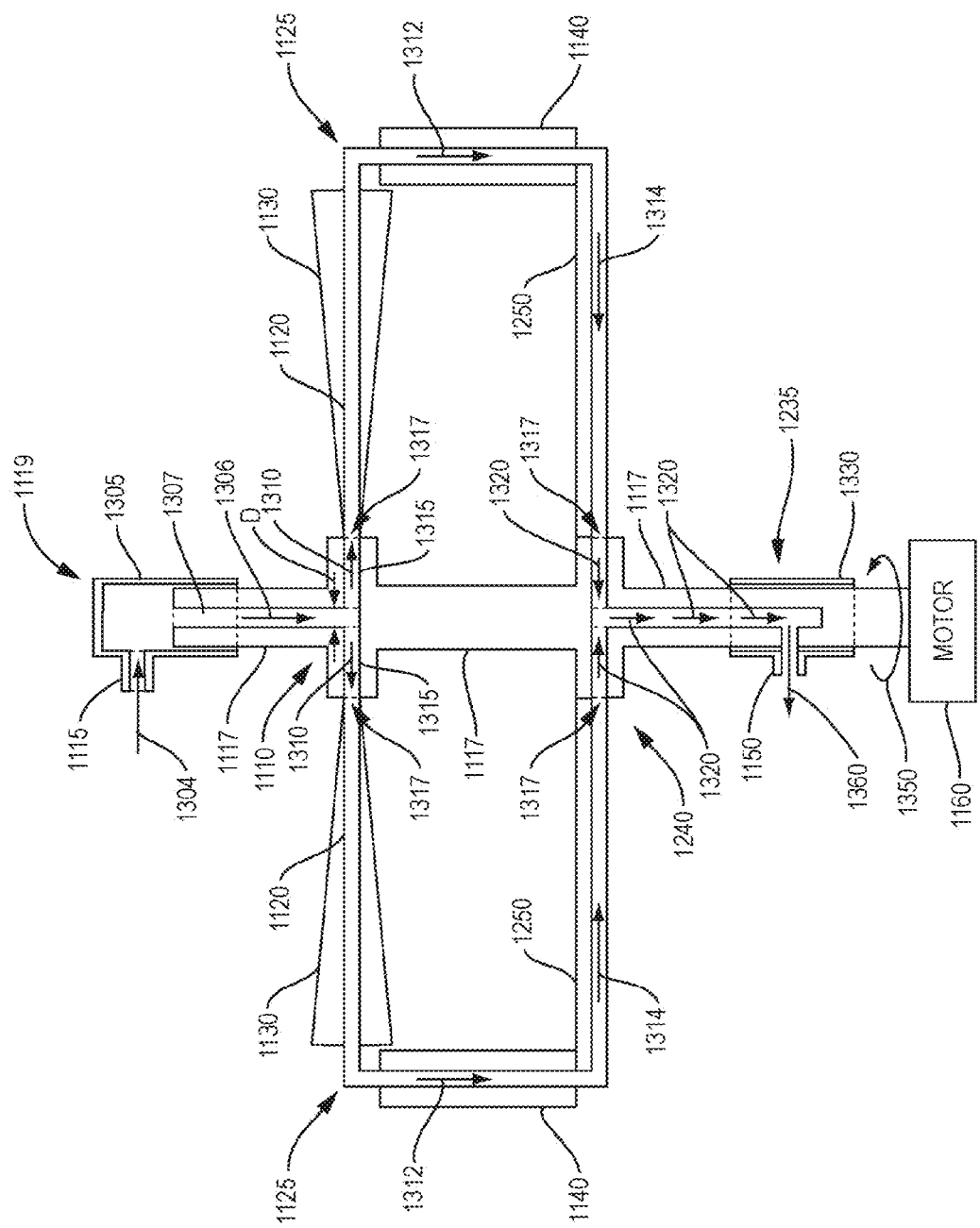
FIG. 13 is a cross-sectional schematic view of the turbo-compressor-condenser-expander according to the illustrative embodiment.

Reference is now made to FIG. 13 showing a cross-sectional schematic view of the flow of refrigerant within the ITCCE 1100. The refrigerant enters through an inlet tube 1115 as shown by arrow 1304. The stationary inlet tube 1115 feeds into an inlet collection tank 1119 that is rotationally fixed and joined by a rotary seal assembly 1305 to a coaxially rotating axle 1117, which provides an internal passage 1307 for refrigerant to pass through the axle 1117 into the hub 1110. The diameter 'D' of the internal passage can be and eighth of an inch to three-quarters of an inch in various illustrative embodiments. Other sizes, both smaller and larger, are contemplated for the passage and the spokes of the ITCCE 1100. This embodiment employs a single central axle 1117 that extends from the motor 1160 through the outlet rotary seal assembly 1330, through the lower hub 1240 and upper hub 1110 and terminates at the inlet rotary seal assembly 1305. The axle is hollow along at least two segments to provide for the inlet and outlet of refrigerant into the conduits 1120 of the ITCCE 1100. The bearing seal assemblies 1305 and 1330 can be of any acceptable construction described above with respect to the illustrative embodiment of FIG. 8 to allow the refrigerant to pass therethrough while the axle 1117 rotates. In one example the rotary seals can consist in device 008-12230-32, a high-speed air-hydraulic union (see by way of example: http://www.rotarysystems.com/series-008). Another exemplary rotary fluid union is available from Deublin of Waukegan, Ill., as model number 1102-070-029. This union comprises a ⅝"-18 UNF RH 21 1102-070-079 UNF LH combination. This device uses a spring loaded carbon graphite stationary face combined with a ball bearing supported polished steel rotating face, with a metal crush washer face seal. The size and scale of the unions used in this embodiment are proportional to output and scale of the ITCCE. Also, while not shown, at one or more points along the axle, there may be provided bearings for mounting the rotating assembly of the ITCCE within a stationary framework.

The refrigerant flows as shown by arrow 1306 down into the central hub 1110. The refrigerant then flows outwardly in the first, upper set of radial conduits of the spokes 1120 as shown by arrows 1310 out from the central hub 1110. The axle 1117 is hollow over a length that extends from its end inside the rotary seal 1305 to a place where its diameter increases at the hub 1110. The axle at its larger diameter of the hub 1110 is perforated with a plurality of radial passages 1315 that penetrate into the axle shaft 1117 so as to create conduits to and through the spokes 1120 of the ITCCE 1100 for the flow of refrigerant. The spokes are fastened to the shaft 1117 at these conduits by screws, fasteners, or other appropriate securing mechanisms 1317. The refrigerant flows radially out from the central hub 1110 in the first set of radial conduits of the spokes 1120. These conduits are surrounded by radial blades 1130 in thermal contact therewith. The refrigerant thereby achieves a maximum temperature and pressure at the ITCCE perimeter 1125.

The refrigerant then flows down through the axial blades 1140 as shown by arrows 1312 and heated air is passed out from the axial blades 1140 see arrow 1145 of FIG. 12). The refrigerant loses heat, possibly causing condensation. The refrigerant then flows, as shown by arrows 1314, back to the second, outlet central hub 1240 of the central axle 1117, and in the process undergoes expansion and its temperature drops. The thermally insulated tubes end at holes on the periphery of the shaft to which they are fastened by screws or by other securing mechanisms 1317. The refrigerant then flows down the central axis as shown by arrows 1320. The rotating seal assembly 1330 is rotatably fixed and joined to the stationary collection tank 1235. The axle 1117 rotates (arrow 1350) within the stationary collection tank 1235 via the rotating seal assembly 1330. The refrigerant flows out of the stationary collection tank 1235 via outlet tube 1150 as shown by arrow 1360.

Figure 14:
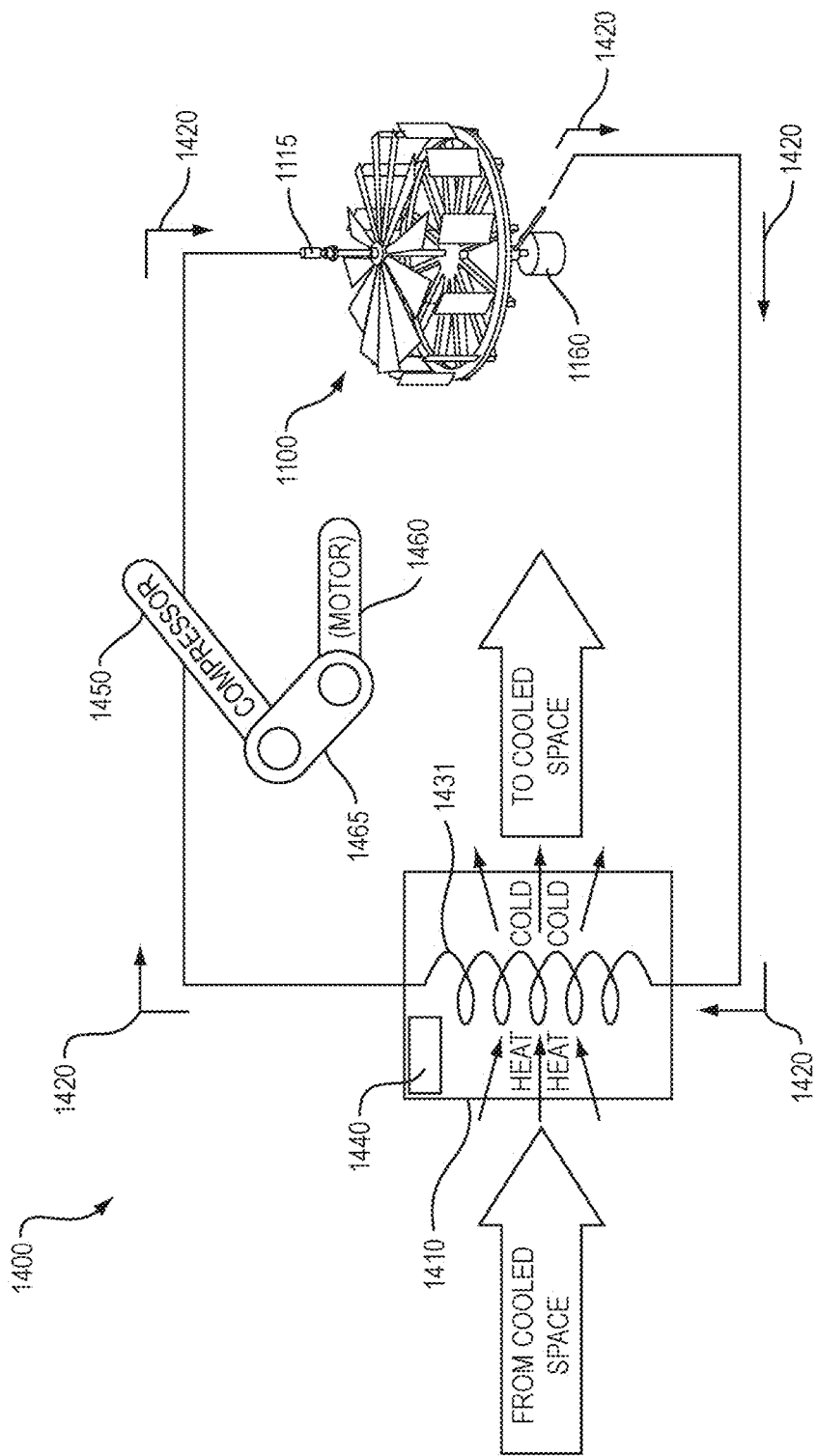
FIG. 14 is a block diagram of an air-conditioning/heat-exchange transfer system including a turbo-compressor-condenser-expander according to an illustrative embodiment.

In an operative embodiment, it is typically desirable to perform a separate, discrete precompression of the refrigerant prior to admitting it into the ITCCE at inlet tube 1115 in order that its temperature exceed the temperature of the surrounding air at perimeter point 1125. FIG. 14 shows a compression arrangement that includes both a discrete pre-compressor and an ITC according to an illustrative embodiment. The air-conditioning/heat-exchange system 1400 employs an ITCCE 1100.

FIG. 14 is a block diagram of an exemplary air-conditioning/cooling system loop 1400 comprising an ITCCE 1100 that performs the compression, cooling (with possible condensation) and expansion of refrigerant required to cool the airflow through compartment 1410. Refrigerant expansion/decompression occurs within the second radial set of conduits 1220. The expanded refrigerant enters directly from the outlet member 1150 to the compartment 1410 free of any separate expansion valve. In alternate embodiments, an optional expansion valve may be used if decompression along the return radial conduits is incomplete. A flow ambient air (or another fluid) is passed through the compartment 1410 possibly using a fan 1440 or equivalent impeller/mass-flow driver. As described above, the fan 1440 directs the air/fluid over coils 1431 within the loop or circuit 1400 to exchange heat from the air/fluid with the refrigerant as shown. Notably, the conventional compressor/condenser arrangement such as that illustrated in FIG. 1 (110), employing two devices in sequence to perform the two heat-transfer operations separately in a continual cycle (flow arrows 1420) through the loop 1400, has been substituted with a single ITCCE 1100 and a pre-compressor 1450 according to an illustrative embodiment.

In operation, the (higher-heat) refrigerant, in its gaseous form, enters the pre-compressor 1450 to undergo pre-compression. As shown, the pre-compressor is driven by a motor 1460 via a belt 1465, however the compressor can be driven according to any system or method for initiating the compression. The pre-compressed refrigerant then enters the ITCCE 1100 via a stationary inlet tube 1115, as described in greater detail above with reference to FIGS. 11-13. The ITCCE 1100, performs the compression via centrifugal force exerted on a set of spokes spinning under the drive of an electrically (or other form of motive power) driven motor 1160. Such compression occurs within the spokes after refrigerant is relatively evenly distributed thereinto via the hub 1110. The motor 1160 can be single speed, multi-speed, or variable speed as appropriate. Likewise, the size and power of the motor is highly variable. In an embodiment the pre-compressor raises the pressure of the refrigerant to approximately 5 atmospheres Notably, the ITCCE is constructed and arranged such that it also performs additional isothermal compression and performs the cooling, which may or may not include associated condensation, by drawing air or other cooling fluid across the device. The ITCCE further expands the refrigerant. In this manner, the fluid output 1420 of the ITCCE is a cooled, low-pressure refrigerant vapor possibly saturated with accompanying refrigerant liquid, similar to the output of a conventional expansion valve (125 of FIG. 1), but accomplished using the ITCCE 1100, as opposed to three discrete, interconnected devices for performing the compression, condensation and evaporation cycles of refrigerant in an air-conditioning system.

Figure 15:
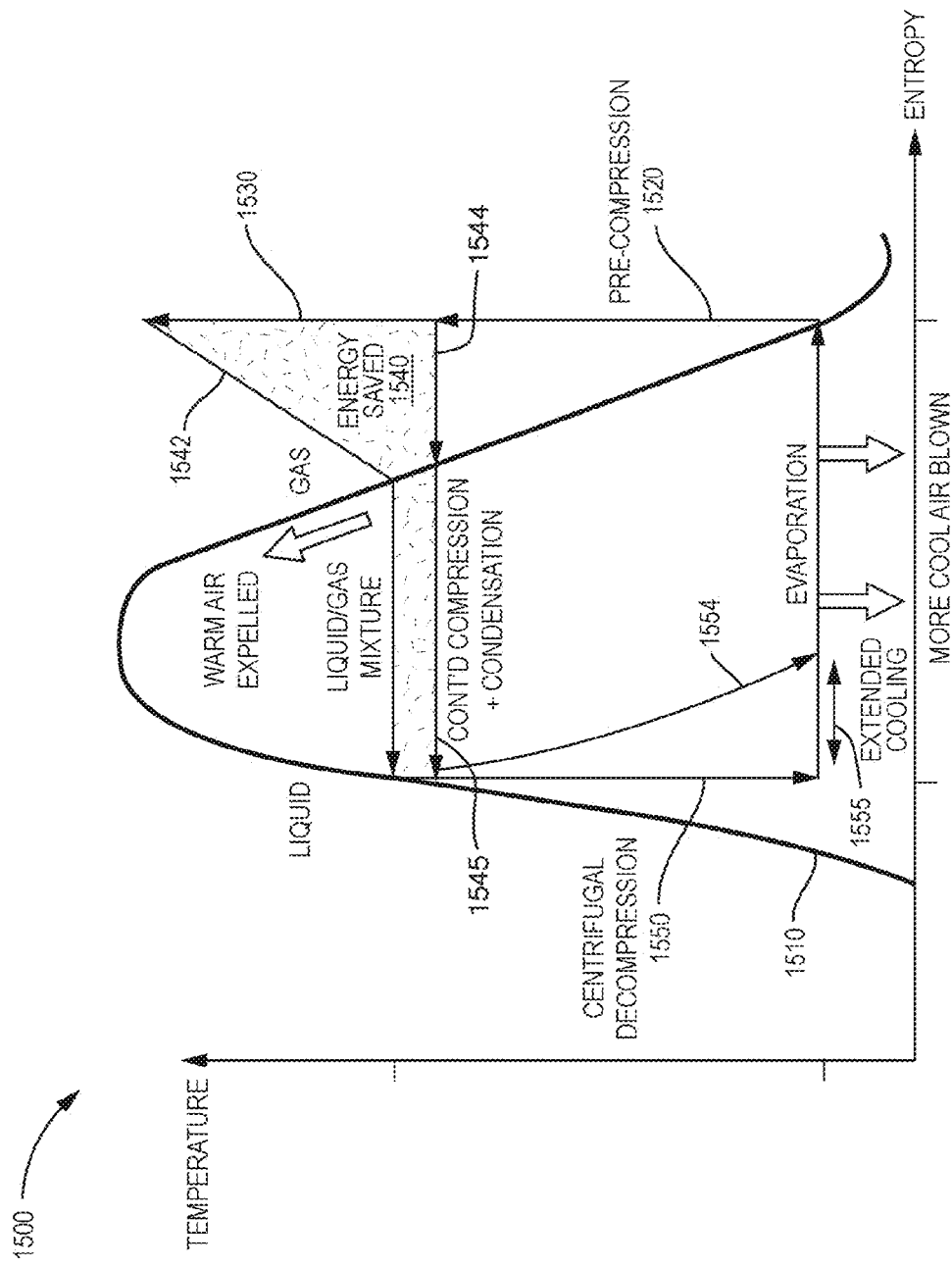
FIG. 15 is a graphical representation of the temperature versus entropy for a conventional refrigerant compression and decompression compared to the isothermal turbocompressor according to the illustrative embodiments

FIG. 15 is a generalized graph 1500 showing the energy saved by employing pre-compression according to the illustrative system of FIG. 14, as compared with a conventional refrigeration cycle. The graph is applicable to a variety of refrigerants, such as R-22, or more typically R-134a. The conventional refrigeration thermodynamic path (arrows 1530, 1542 and 1554) is a 1 ton air-conditioning unit. Line 1510 shows the state of the refrigerant as liquid, gas, or a liquid/gas mixture. One advantage of the ITCCE is that it can operate in the presence of liquid, a mixture of condensing vapor and liquid, or vapor alike, as it comprises the tubular channels with no reciprocating devices, one-way valves, or other similar mechanisms found in adiabatic compressors. According to a conventional compression refrigeration cycle, a compression of a supersaturated vapor is conducted because the presence of any liquid interferes with the mechanisms of a typical compressor device, and operation with a supersaturated vapor can prevent condensation. Because the ITCCE performs compression 1544, condensation 1545 and isoentropic expansion 1550 gradually, and the gentle gradient in pressure from the axis to the perimeter follows more closely to the definition of a thermodynamically reversible process. Note that the first set of radial conduits (upper set as depicted) and associated blades perform compression as shown by the graph segment identified by arrow 1544. The axial conduits on the outer perimeter, and associated blades, perform condensation as referenced by the graph segment identified by arrow 1545.

Note that, while the term "condensation" and "compression" are used herein, it is contemplated that some refrigerants may become supercritical, rather than condensing in the typical sense, wherein the difference between vapor and liquid states in indistinct. The refrigeration cycle still occurs when using such refrigerants, but the temperature profile differs from that described in the graph of FIG. 15. Hence, in cases where such refrigerants that may move into a supercritical state for some or all of the refrigeration cycle (for example $CO_2$ and ethane), the terms "compression" and "condensation" should be taken broadly herein to include the behavior of such refrigerants. Note that a supercritical condition may occur within the axial conduits, and the condensation would occur in the second radial set of return conduits in the form of phase separation.

Arrow 1520 of the graph 1500 shows the pre-compression performed according to an illustrative embodiment. The arrow 1530 shows the further compression required of a conventional refrigeration cycle. Thus the shaded area 1540 represents the energy saved by the system employing a pre-compressor 1450 and ITCCE 1100, as shown in the illustrative embodiment of FIG. 14. The graph of FIG. 15 further shows the additional energy required to convert the gas back to a liquid of arrow 1542, not required for ITCCE 1100 because it can be a gas or a liquid. The ITCCE undergoes reversible (constant entropy) centrifugal decompression as shown by arrow 1550. The mechanical energy produced by this decompression (expansion) is communicated to the rotary device, thus reducing the energy demanded for the compression performed by the ITCCE. Furthermore, at its exit from the ITCCE, the refrigerant is in a state of lower entropy compared to its state at the exit of the expansion valve in a conventional system. The ITCCE thus extends the cooling time (thereby improving the amount of cooled air that is transferred) as shown by the extended cooling arrow 1555 of FIG. 15.

Figure 16:
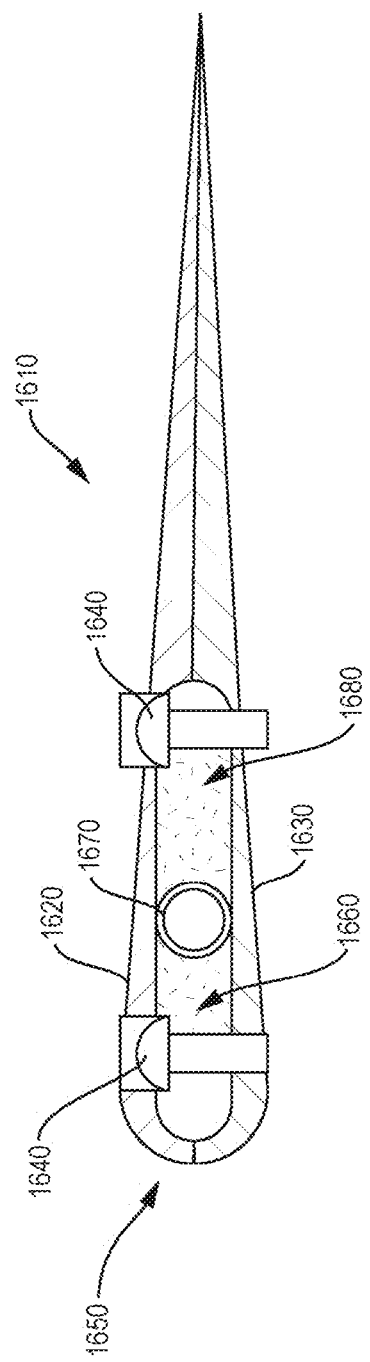
FIG. 16 is a side cross section of an airfoil shape applicable to a heat-transfer blade of the turbo-compressor-condenser-expander in accordance with embodiments herein.

FIG. 16 depicts an illustrative axial cross-sectional shape for a heat-exchanging blade 1610 according to an embodiment. As noted above, the shape and structure of the fins, blades or other aerodynamic heat-exchanging elements are highly variable. In the above-described embodiment, a diamond airfoil constructed from sheet steel or aluminum alloy is employed for ease of construction. However, other shapes are expressly contemplated, such as that depicted in FIG. 16. This blade 1610 generally defines a NACA airfoil having a symmetrical teardrop shape. In this embodiment, a pair of airfoil halves 1620, 1630 is formed, in whole or in part, from cast or stamped metal, carbon composite, or another heat-conducting material. The halves are joined together using plurality of fasteners (screws, rivets, etc.) 1640, at appropriate locations along the blade surface. The blade defines, adjacent its leading edge 1650 a passage 1660 that can be filled with fluid, or house one or more fluid conduits (a single conduit 1670 in this example). The conduit is in contact with the blade material to facilitate heat-transfer. Additional structures can be used to increase surface contact between the conduit 1670 and blade material. Likewise, a thermally conductive packing 1680 can surround the conduit within the passage 1660. In alternate embodiments, the blade 1610 can also be implemented as an asymmetrical airfoil. Note that the term "airfoil" as used herein should be taken broadly to include any shape that causes a redirection of airflow thereover, including, but not limited to single sheet blades and vanes and diamond-cross section blades. Note that, where blades are not used in the framework for heat transfer, they can be constructed from a low-heat conducting material, such as laminated wood or fiberglass composite. The conduit 1670 inside blade 1610 may follow a straight path, a sinuous path, or any other path in order to promote heat transfer between the refrigerant it contains and the embedding material.

Figure 17:
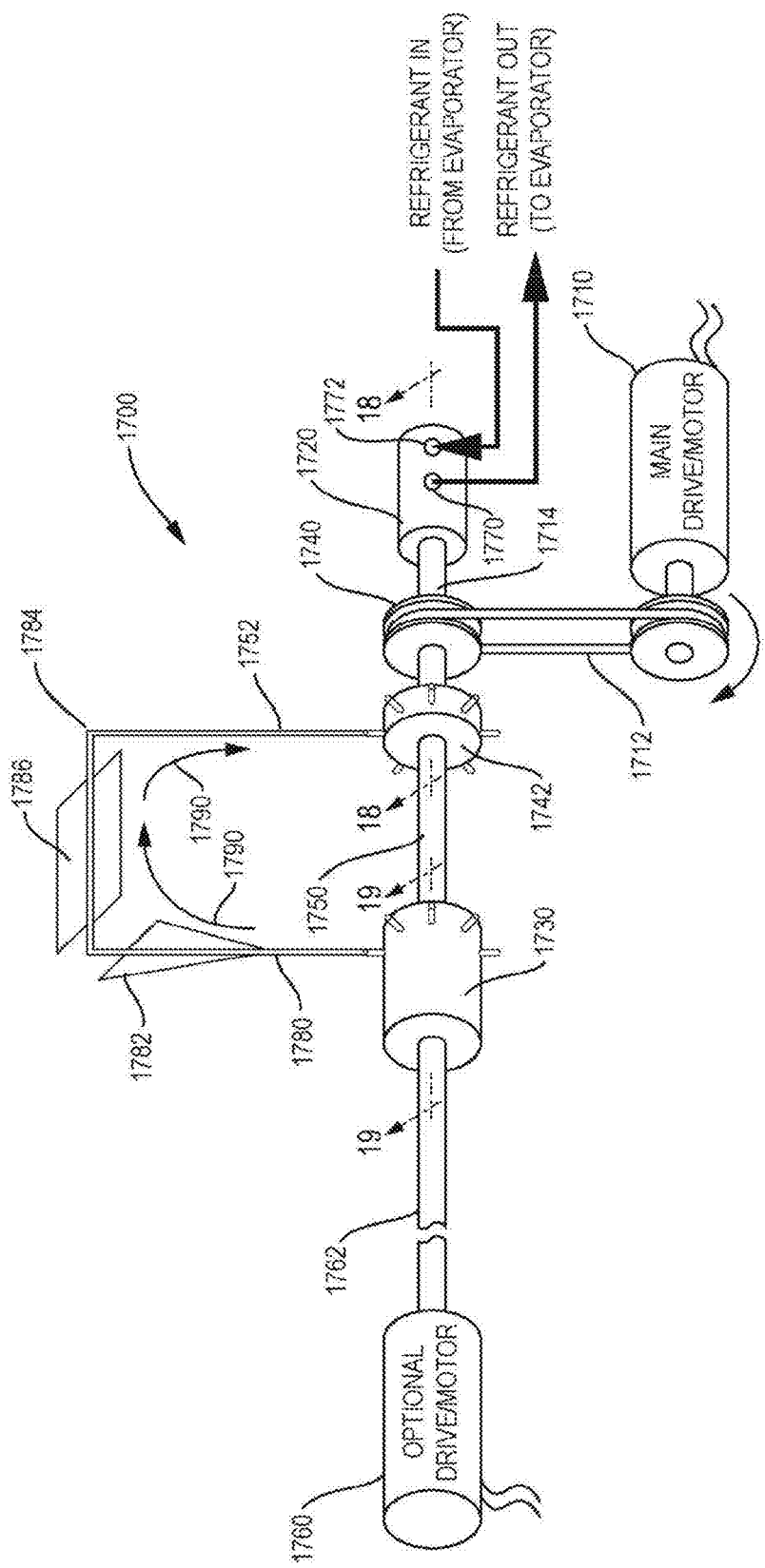
FIG. 17 is a diagram of an arrangement including a turbo-compressor-condenser-expander according to an alternate embodiment, including a coaxial precompressor and a coaxial fluid union providing both a refrigerant inlet and refrigerant outlet.
Figure 19:
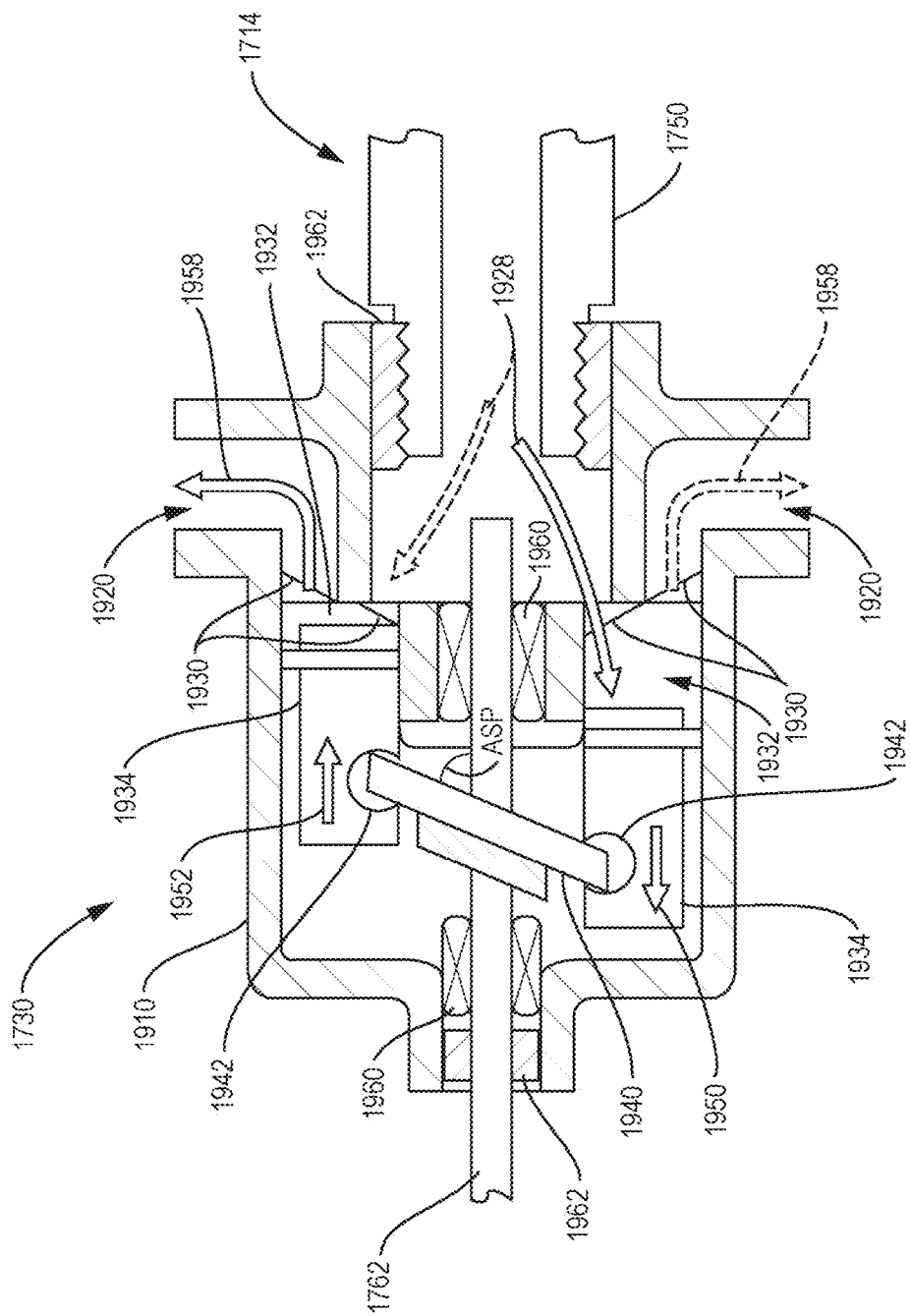
FIG. 19 is a side cross section of the coaxial precompressor taken along line 19-19 of FIG. 17.

Reference is now made to FIG. 17, which details an alternate embodiment of the isothermal turbocompressor-condenser-expander 1700. As shown, the main drive motor 1710 is mounted in an offset arrangement, and operatively connected to the main shaft assembly 1714 by a belt and pulley assembly. A gear train or other power transmission arrangement can be employed in alternate embodiments. The main shaft assembly 1714 is generally hollow along its length between a coaxial fluid union 1720 and a coaxial precompressor 1730, each described in further detail below. The main shaft assembly 1714 extends past the motor drive sheave 1740 to fluid-transferring the central hub 1742. Axially for the hub, the main shaft assembly 1714 defines a hollow connecting shaft 1750 that extends to the coaxial precompressor assembly 1730 of this embodiment. As described below, the precompressor assembly is driven by a secondary shaft 1762, which is independent of rotation of the main shaft assembly 1714. In an embodiment, the shaft 1762 is stationary (i.e. non-rotating and fixed to the associated mounting assembly). In alternate embodiments, the shaft 1762 can be supplementally, or alternatively, driven by an optional drive motor 1760. The optional drive motor can comprise a "canned" rotor that is enclosed within the housing (1910) fluid circuit and separated hermetically from the stator by a membrane. Likewise, the motor and shaft (1762) can be linked to the housing by a magnetic coupling that avoids the need for the seal 1962. The stationary embodiment of the shaft 1962 can likewise be interconnected with the piston assembly via a magnetic coupling that eliminates the through-shaft and seal arrangement depicted in FIG. 19.

Figure 18:
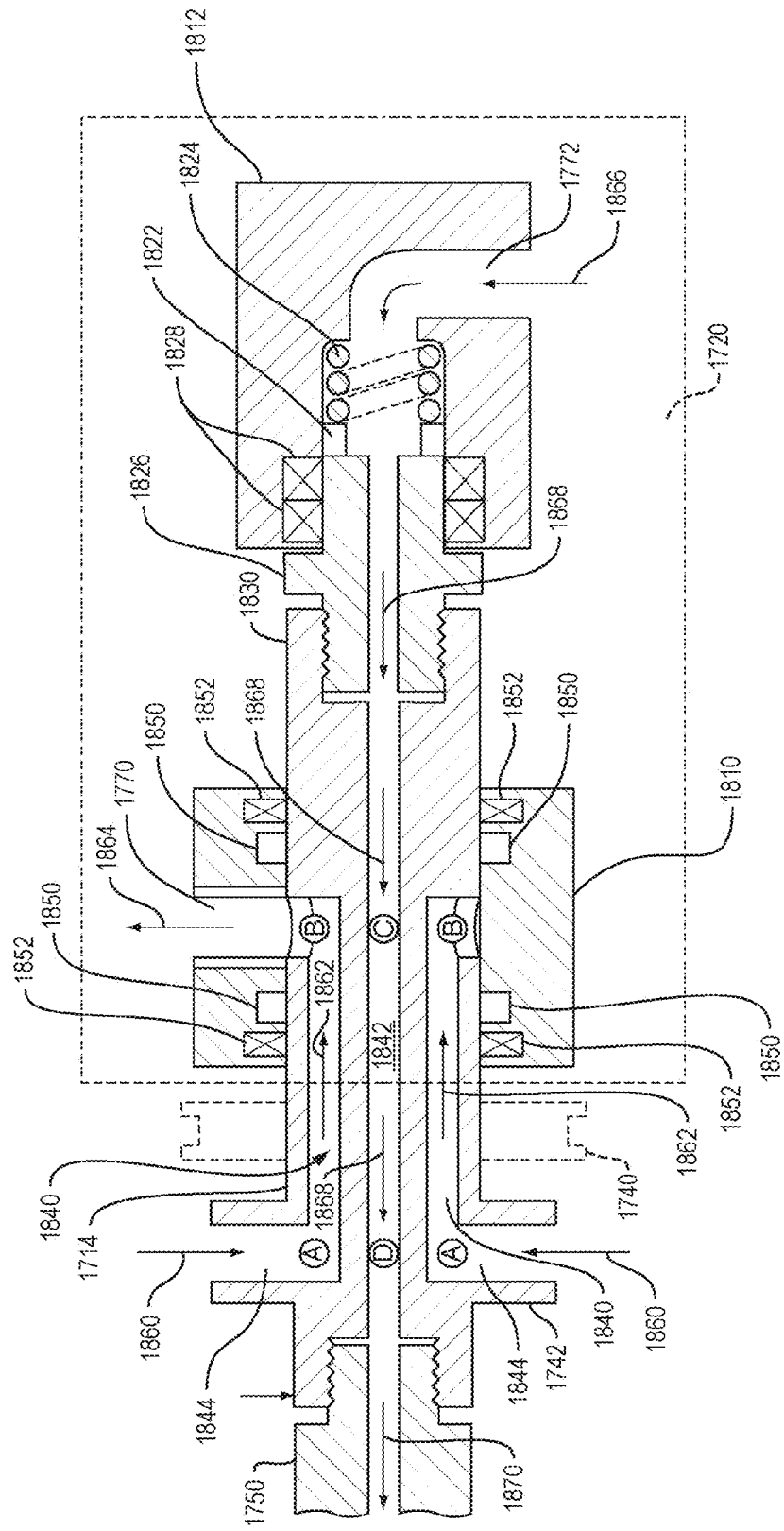
FIG. 18 is a side cross section of the coaxial fluid union and adjacent main shaft assembly components taken along line 18-18 of FIG. 17.

With further reference to the side cross section of FIG. 18, the coaxial fluid union 1720 and adjacent main shaft assembly 1714 is shown in further detail. This coupling provides both an outlet 1770 for cold, low-pressure refrigerant to be delivered to the evaporator assembly (in the refrigerant loop), and an inlet 1772 for evaporated, low pressure refrigerant delivered from the evaporator assembly back to the ITCCE. Both the inlet 1772 and outlet 1770 are provided on stationary (non-rotating) bases of rotatable fluid couplings 1812 and 1810. The inlet coupling 1812 includes a face seal 1822 that is biased by a spring 1824 into engagement with a rotating base 1826. The rotating base 1826 is rotatably interconnected to the inlet base 1812 by a set of bearings 1828 that allow free rotation therebetween while the face seal 1822 avoids loss of fluid through the rotating joint. The rotating joint forms a hollow passage for refrigerant from the stationary inlet base 1812 into the rotating shaft member 1830. The rotating shaft member 1830 extends axially to the stationary outlet base 1810 that is in fluid communication with an external channel system 1840 formed coaxially with a central channel 1842. The channel system includes a series of passages disposed about the circumference of the shaft and each interconnected with a port 1844 in the return (lower or "second") central hub 1742. The outlet base 1810 is sealed with respect to the shaft 1830 by stationary face seals 1850.

Rotation between the base 1810 and shaft 1830 is facilitated by bearings 1852. Thus, expanded refrigerant returns (arrows 1860) from the radial conduits 1752 to the hub 1742, and then travels (arrows 1862) along the passages 1840 into the stationary outlet base, where it is directed (arrow 1864) to the evaporator via the loop.

The evaporated refrigerant enters from the loop (arrow 1866) via the inlet base 1812 and passes (arrows 1868) into the central channel 1842. The refrigerant thereafter travels axially past the hub 1714 and into (arrow 1870) the hollow connecting shaft 1750 that interconnects the two spoke hubs. The refrigerant then travels axially into the precompressor (upper or "first") hub assembly 1730 according to this embodiment. The precompressor hub, like the return hub 1742 acts as an interconnection for each conduit and blade loop (for example, radial conduit 1780 and radial blade 1782; axial conduit 1784 and axial blade 1786; and radial conduit 1752). These hubs 1742, 1730 also support the framework structure for each spoke under the rotational torque of the main drive motor 1710.

The precompressor 1730 can be constructed in a variety of manners. In this example, and referring also to FIG. 19, the precompressor includes an outer housing 1910 that supports the spoke framework (not shown), and defines ports 1920 associated with each radial compression conduit and blade assembly (1780, 1782). The housing 1910 rotates on the end of the hollow connecting shaft 1752, that is driven by the motor 1710 and associated linkages and couplings. Refrigerant travels from the connecting shaft 1750 into the interior of the housing 1910. The fluid then selectively travels (arrows 1928) trough an array of suction and discharge reed valves into cylinders 1932 positioned around the circumference of the housing. The number of cylinders 1932 can equal the number of ports 1920 or a cylinder can interconnect via appropriate fluid channels in the housing 1910 with multiple ports. The cylinders 1932 each house a respective piston 1934 that reciprocate within the respective cylinders based upon the interaction of a stationary (or separately driven) swash plate 1940 and a cylinder groove 1942. The swash plate 1940 is fixed to the shaft 1762 at a relative angle AS, as shown. The shaft moves differentially with respect to the housing 1910—either due to a separate drive connection (e.g. motor 1760), or due to the rotational differential between a fixed shaft 1762 and the rotating housing 1910. The swash plate 1940 thereby rotates with respect to the pistons and its relative mounting angle ASP conforms to the stroke distance for each piston. The swash plate thereby urges the pistons back and forth as its edge rides in each piston's groove 1942.

The reed valves 1930 open and close in response to the stroke of the respective piston 1934 so that refrigerant is drawn (arrows 1928) in from the shaft 1750 when pistons move in a downstroke (arrow 1950) and expelled (arrows 1958) under compression into the ports 1920 when the pistons move in an upstroke (arrow 1952). Appropriate bearings 1960 and face seals 1962 prevent fluid loss through the housing at the interface with the connecting shaft 1750 and the drive shaft 1762. In this manner the flow (arrows 1780) of precompressed refrigerant into further compression in the first radial conduits 1780, condensation in the axial conduits 1784 and predetermined expansion in the second set of radial (return) conduits is maintained.

It should be clear that the operative principles used to construct the precompressor are highly variable, and this embodiment can also be implemented with a central hub that is free of a precompressor, and a discrete, separate precompressor within the loop.

Note also, with reference to FIG. 18 that the region of counter-current refrigerant flow designated as ABCD is advantageously arranged to transfer heat in when certain types of refrigerant would benefit from such heat-transfer. When using alternate refrigerants, a more adiabatic arrangement, with less or no heat transfer is desirable. In such instances, an insulating layer can be provided between the inner passage 1842 and outer passages 1840.

By locating the drive sheave, inlet base and outlet base on one end of the device, it is contemplated in an alternate embodiment that the framework can be constructed in a cantilever manner. That is, the structural support is primarily provided on one side of the device, and the shaft is supported adjacent to the inlets and sheave.

As in other embodiments described herein, the size of conduits, passages and other refrigerant-handling components is highly variable. Sizing is generally associated with desired BTU output and overall refrigerant charge of the unit. Sizing of components can be optimized using conventional fluid-dynamic and thermodynamic principles, as well as through experimentation, employing trial and error to determine optimum component size.

It should be clear that the above-described ITCCE embodiments provide a durable, efficient and cost-effective solution to the need for a more energy efficient heat-transfer system. The turbo-compressor-condenser-expander can be constructed from inexpensive components and materials, exhibit a long working life, and significantly reduce overall system component count.

The foregoing has been a detailed description of illustrative embodiments of the invention. Various modifications and additions can be made without departing from the spirit and scope of this invention. Each of the various embodiments described above can be combined with other described embodiments in order to provide multiple features. Furthermore, while the foregoing describes a number of separate embodiments of the system and device of the present invention, what has been described herein is merely illustrative of the application of the principles of the present invention. For example, the isothermal turbocompressor has been illustrated having blades surrounding and encasing the spokes entirely. However, the blades can comprise any structure or orientation with respect to the spokes, wherein the blades are in thermal communication with the channels or conduits associated with each of the spokes. Further, each spoke is depicted as including or supporting one refrigerant channel/conduit, however any number of channels, conduits, pipes or tubes may be provided with respect to each spoke. Likewise, not all spokes need support one or more conduits. Some spokes can act exclusively as structural supports for the fan/wheel, and/or as fan blades. The device is highly applicable to all air conditioning, refrigeration and/or heat-pumping systems. Also, the number of conduits, tubes or passages that are disposed with respect to each spoke for the flow of refrigerant is highly variable, and the tubes or passages need not be of circular cross-section but may be varying in size and shape from tube to tube, or even along the same tube. Conduits may follow a straight path, a curved path, a sinuous path, or a path of any other shape along the blades in which they are. The arrangement of the tubes is also variable. Moreover, the shape, size and materials of the turbocompressor and any associated housings, supports, brackets, and the like are highly variable, and can be adapted to the system in which the turbocompressor is employed. In addition, the types of motor, power, control and fluid interconnections and systems associated with the turbocompressor are also highly variable and can be adapted to the particular application in which the turbocompressor/turbo-compressor-condenser-expander is used. Accordingly, this description is meant to be taken only by way of example, and not to otherwise limit the scope of this invention.

What is claimed is:

1. A turbo-compressor-condenser-expander assembly comprising:
   a first plurality of spokes extending radially outwardly from a first central hub to an outer perimeter, at least some of the first plurality of spokes each including a respective first radial conduit such that refrigerant is distributed evenly from the first central hub to each of the respective first radial conduits associated with the at least some of the first plurality of spokes and subsequently transported to the outer perimeter and a radial blade in thermal communication with the first radial conduit that promotes heat exchange radially; and
   a motor that rotates a central axis operatively connected to the first central hub to thereby rotate the first plurality of spokes so that the refrigerant experiences centrifugal force to perform compression with respect to each first radial conduit.

2. The turbo-compressor-condenser-expander as set forth in claim 1 wherein the first central hub includes a precompression assembly.

3. The turbo-compressor-condenser-expander as set forth in claim 1 wherein the precompression assembly comprises a housing having a piston assembly in fluid communication with each first radial conduit and wherein the refrigerant is directed into the piston assembly so as to be precompressed by the piston assembly before entering each first radial conduit.

4. The turbo-compressor-condenser-expander as set forth in claim 1 further comprising a discrete precompressor unit operatively connected by a conduit to the first central huh.

5. The turbo-compressor-condenser-expander as set forth in claim 1 wherein the first central hub is operatively connected with a first rotating seal assembly that provides an axially stationary interface with an external conduit of a refrigeration loop.

6. The turbo-compressor-condenser-expander as set forth in claim 5 wherein a drive axle is interconnected between the motor.

7. The turbo-compressor-condenser-expander as set forth in claim 1 wherein the first radial conduit defines at least one of (a) an internal space within the radial blade, (b) at least one tube in thermal communication with the radial blade.

8. The turbo-compressor-condenser-expander as set forth in claim 1 wherein at least some of the axial conduits each include at least one of (a) an internal space within the axial blade, (b) a plurality of channels formed radially in a side-by-side relationship along the axial blade, and (c) at least one tube in thermal communication with the axial blade.

9. The turbo-compressor-condenser-expander as set forth in claim 1 wherein the radial blade defines an approximately trapezoidal outline shape that is narrower adjacent the first central hub and wider adjacent to the outer perimeter.

10. The turbo-compressor-condenser-expander as set forth in claim 1 wherein the radial blade and the axial blade each define a cross-section that is an airfoil having a narrow section at each of opposing leading and trailing edges and a wider mid section, the mid section of the radial blade surrounding the first radial conduit and the mid section of the axial blade surrounding the axial conduit.

11. A system for performing compression and condensation of refrigerant in loop, the system comprising:
   a pre-compressor operatively connected to a first drive interconnection, whereby the pre-compressor compresses the refrigerant;
   a turbo-compressor-condenser-expander defining a framework that supports a plurality of radially directed first conduits that extend from a from a first central hub to an outer perimeter radial blades each in thermal communication with at least some of the first conduits; and
   a second drive interconnection that rotates a central axle operatively connected with the first central hub to impart centrifugal force to the refrigerant located in the first conduits, to cause the refrigerant to undergo compression as it travels through the first conduits and to cause the refrigerant to be distributed evenly from the first central hub to each of the first conduits.

12. The system as set forth in claim 11 wherein the first drive interconnection and the second drive interconnection are each operatively connected to a common motor.

13. The system as set forth in claim 11 wherein the framework is constructed and arranged to allow free airflow around the radial blades and the axial blades.

14. The turbo-compressor-condenser-expander as set forth in claim 6 further comprising an outer sleeve that defines a gap between the drive axle and the sleeve to allow the refrigerant to pass therebetween.

15. The turbo-compressor-condenser-expander as set forth in claim 1, at least some of the first plurality of spokes each further comprising a plurality of radial conduits formed radially in a side-by-side relationship along the radial blade.

16. The turbo-compressor-condenser-expander as set forth in claim 1, further comprising a second plurality of spokes extending radially outwardly from a second central hub located at an axial spacing from the first central hub, at least some of the second plurality of spokes each including a second radial conduit that transports refrigerant from the outer perimeter to the second central hub.

17. The turbo-compressor-condenser-expander as set forth in claim 16, further comprising a plurality of axial conduits extending axially at the outer perimeter between the first plurality of spokes and the second plurality of spokes, and each interconnecting the first radial conduit and the second radial conduit, respectively, to direct refrigerant therebetween, at least some of the plurality of axial conduits each including an axial blade in thermal communication with the axial conduit that promotes heat exchange.

18. The turbo-compressor-condenser-expander as set forth in claim 16, further comprising axial blades each in thermal communication with at least some of the axial conduits.

19. The turbo-compressor-condenser-expander as set forth in claim 3, wherein the central axis defines a hollow shaft that directs the refrigerant from an inlet adjacent the second central hub into the piston assembly so as to be precompressed by the piston assembly before entering each first radial conduit.

20. The turbo-compressor-condenser-expander as set forth in claim 19 wherein the inlet adjacent to the second central hub is located on a non-rotating inlet base of a rotating fluid union, and wherein the rotating fluid union includes a non-rotating outlet base, axially separated from the inlet base, the outlet base being in fluid communication with passages that surround a central passage in communication with the inlet, the passages being in fluid communication with each second radial conduit.

* * * * *